United States Patent
Vanderstraeten et al.

(10) Patent No.: US 10,246,248 B2
(45) Date of Patent: Apr. 2, 2019

(54) PRESSURE CONTROL DEVICE, DISPENSER COMPRISING SAID PRESSURE CONTROL DEVICE AND METHOD OF MANUFACTURING

(71) Applicant: Gojara bvba, Destelbergen (BE)

(72) Inventors: Erwin Vanderstraeten, Gentbrugge (BE); Dirk De Cuyper, Destelbergen (BE); Tom Anthierens, Destelbergen (BE)

(73) Assignee: Gojara bvba, Destelbergen (BE)

( * ) Notice: Subject to any disclaimer, the term of this patent is extended or adjusted under 35 U.S.C. 154(b) by 71 days.

(21) Appl. No.: 15/540,243

(22) PCT Filed: Nov. 10, 2016

(86) PCT No.: PCT/EP2016/025144
§ 371 (c)(1),
(2) Date: Jun. 27, 2017

(87) PCT Pub. No.: WO2017/080679
PCT Pub. Date: May 18, 2017

(65) Prior Publication Data
US 2018/0229920 A1    Aug. 16, 2018

(30) Foreign Application Priority Data

Nov. 10, 2015 (BE) .................................. 2015/5737
May 25, 2016 (WO) ................ PCT/EP2016/061840

(51) Int. Cl.
*B65D 83/38* (2006.01)
*B29C 65/16* (2006.01)
(Continued)

(52) U.S. Cl.
CPC .............. *B65D 83/38* (2013.01); *B29C 65/16* (2013.01); *B65D 83/663* (2013.01);
(Continued)

(58) Field of Classification Search
CPC ...... B65D 83/38; B65D 83/663; B29C 65/16; B29C 66/939; B29C 66/919; B29C 66/71; B29C 66/65; B29C 66/612; B29C 66/545; B29C 66/5432; B29C 66/542; B29C 66/232; B29C 66/1224; B29C 66/1222; B29C 65/1677; B29C 65/1661;
(Continued)

(56) References Cited

FOREIGN PATENT DOCUMENTS

| EP | 1725476 A1 | 11/2006 |
|----|-----------|---------|
| EP | 1725476 B1 | 10/2007 |

(Continued)

OTHER PUBLICATIONS

International Search Report for International Application No. PCT/EP2016/025144, dated Feb. 9, 2017.

*Primary Examiner* — Jason K Niesz
(74) *Attorney, Agent, or Firm* — Knobbe, Martens, Olson & Bear, LLP

(57) ABSTRACT

The present invention provides a pressure control device for maintaining a constant predetermined pressure in a fluid dispensing container, as well as a pressure control system which includes the device. The present invention further concerns a method for manufacturing the pressure control device and system of the invention. The invention is of particular importance in the technical field of aerosol sprays.

20 Claims, 29 Drawing Sheets

(51) Int. Cl.
*B65D 83/66* (2006.01)
*B29L 31/00* (2006.01)
*B29C 65/00* (2006.01)

(52) U.S. Cl.
CPC ...... *B29C 65/1616* (2013.01); *B29C 65/1635* (2013.01); *B29C 65/1661* (2013.01); *B29C 65/1677* (2013.01); *B29C 66/1122* (2013.01); *B29C 66/1222* (2013.01); *B29C 66/1224* (2013.01); *B29C 66/232* (2013.01); *B29C 66/542* (2013.01); *B29C 66/545* (2013.01); *B29C 66/5432* (2013.01); *B29C 66/612* (2013.01); *B29C 66/65* (2013.01); *B29C 66/71* (2013.01); *B29C 66/919* (2013.01); *B29C 66/939* (2013.01); *B29L 2031/7142* (2013.01)

(58) Field of Classification Search
CPC . B29C 65/1635; B29C 65/1616; B29L 65/16; B29K 2067/003
See application file for complete search history.

(56) References Cited

FOREIGN PATENT DOCUMENTS

| | | |
|---|---|---|
| EP | 3 186 166 B1 | 2/2018 |
| WO | WO 2005/082744 A1 | 9/2005 |

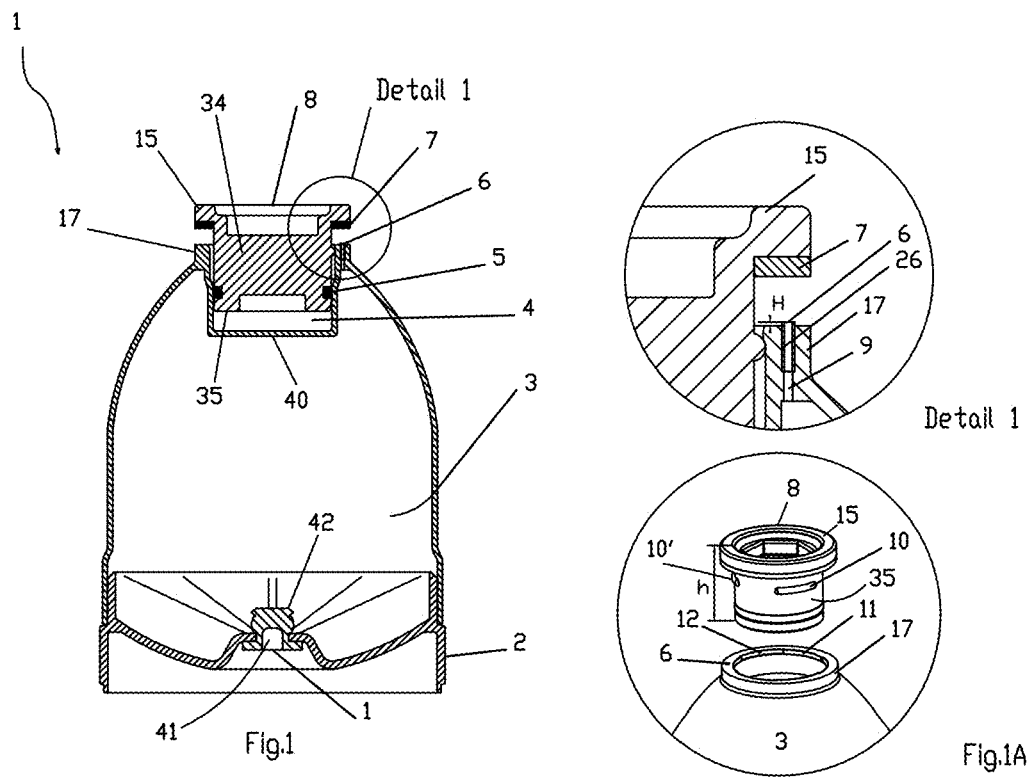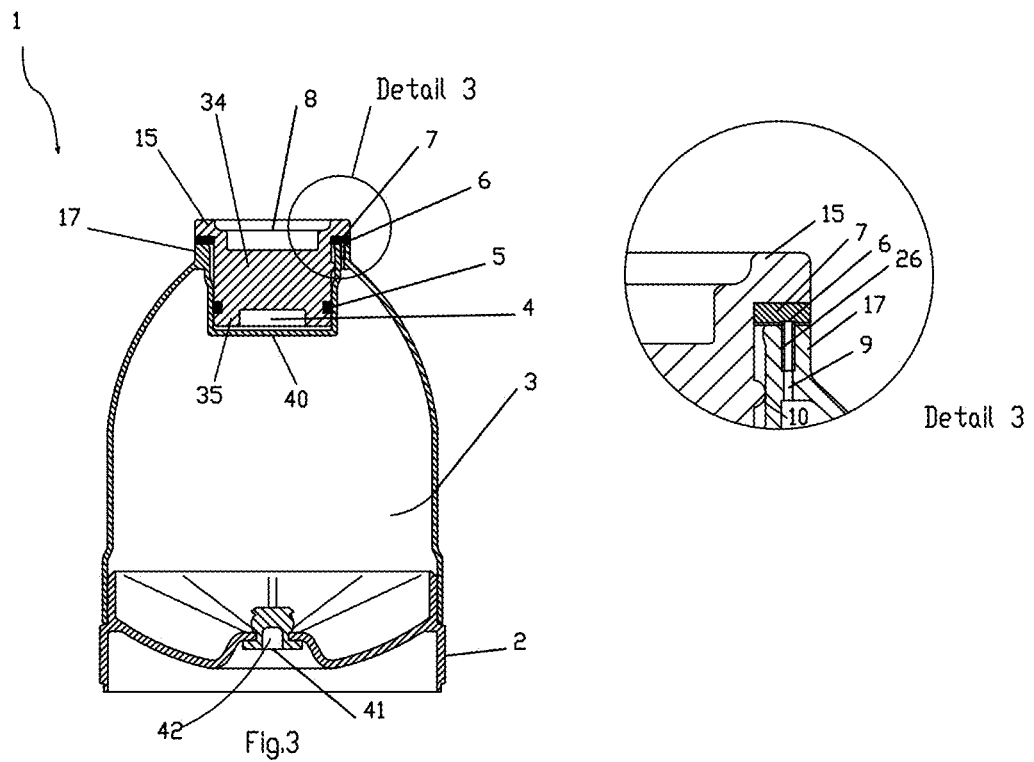

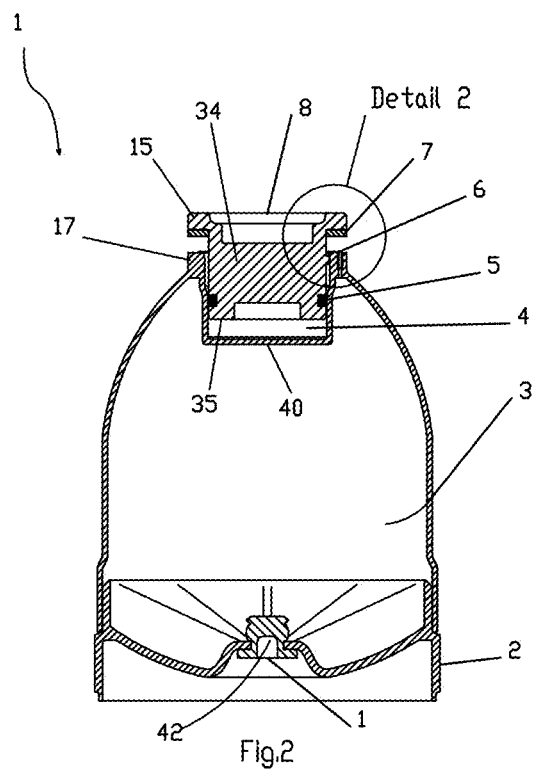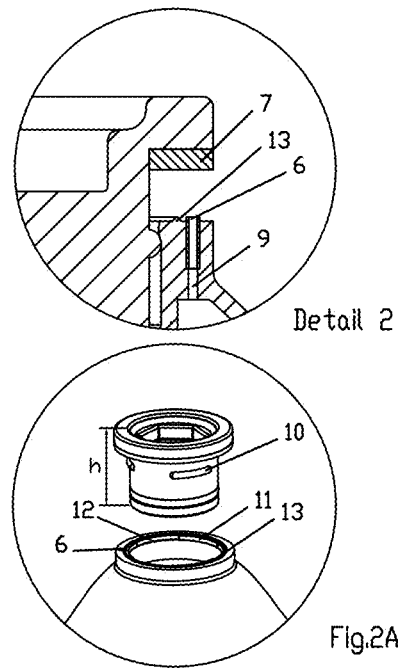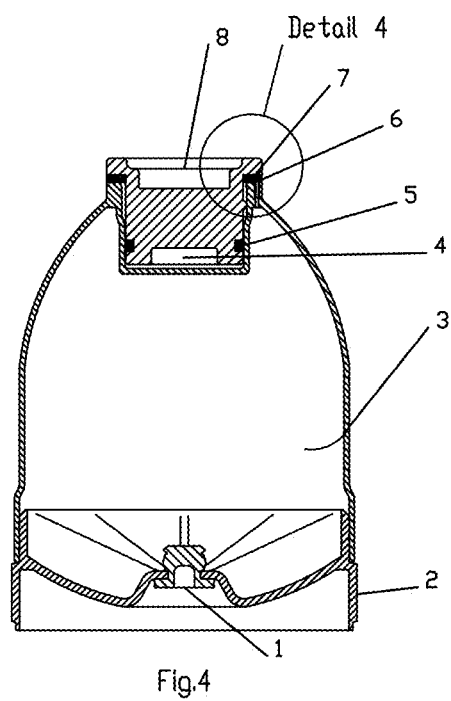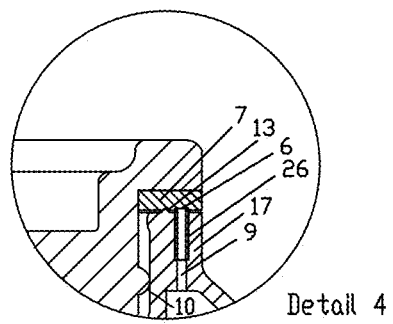

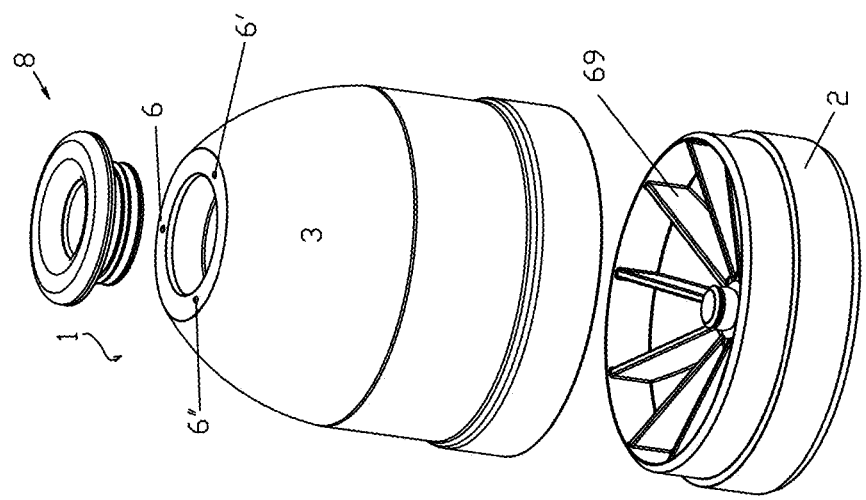
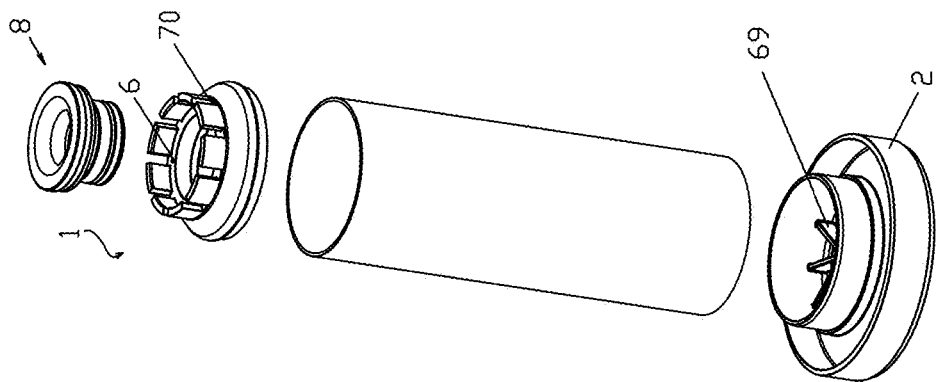
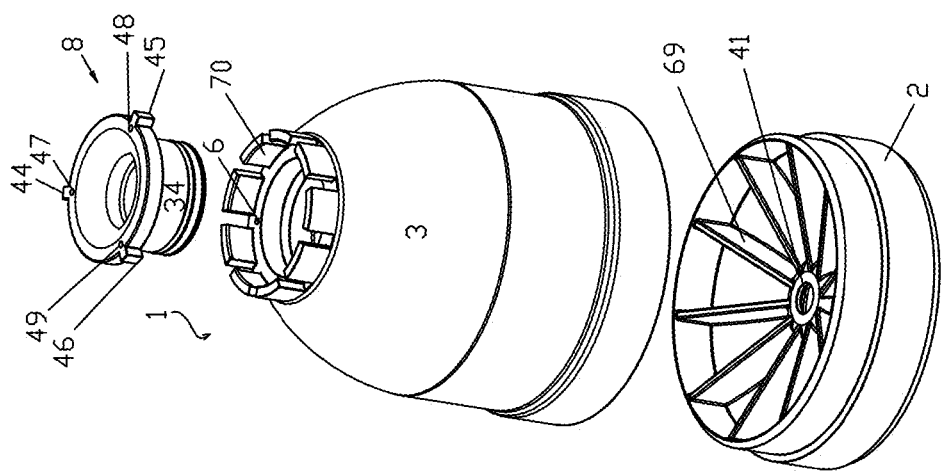

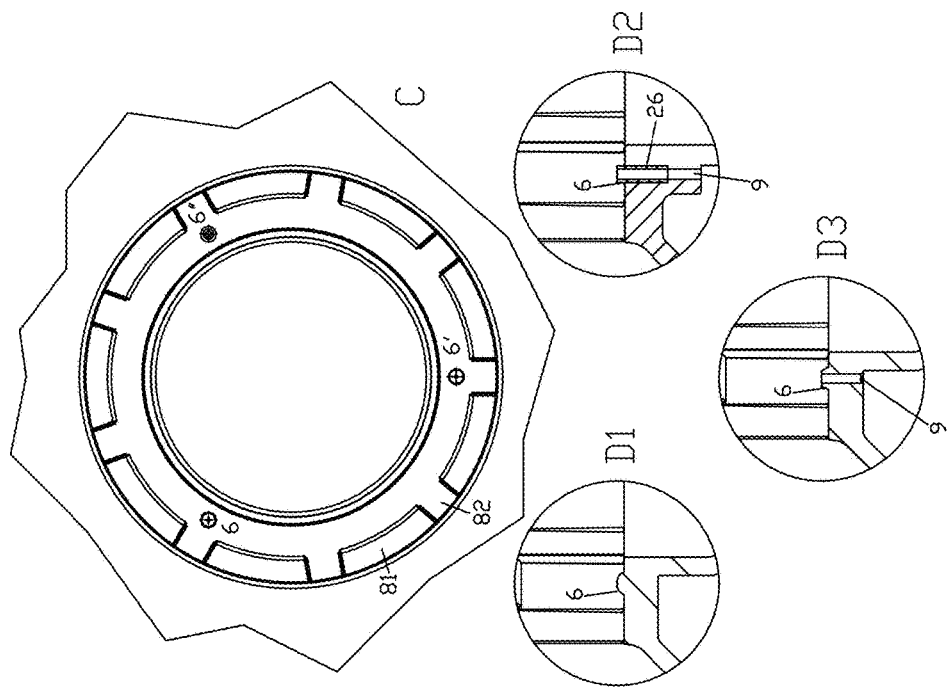
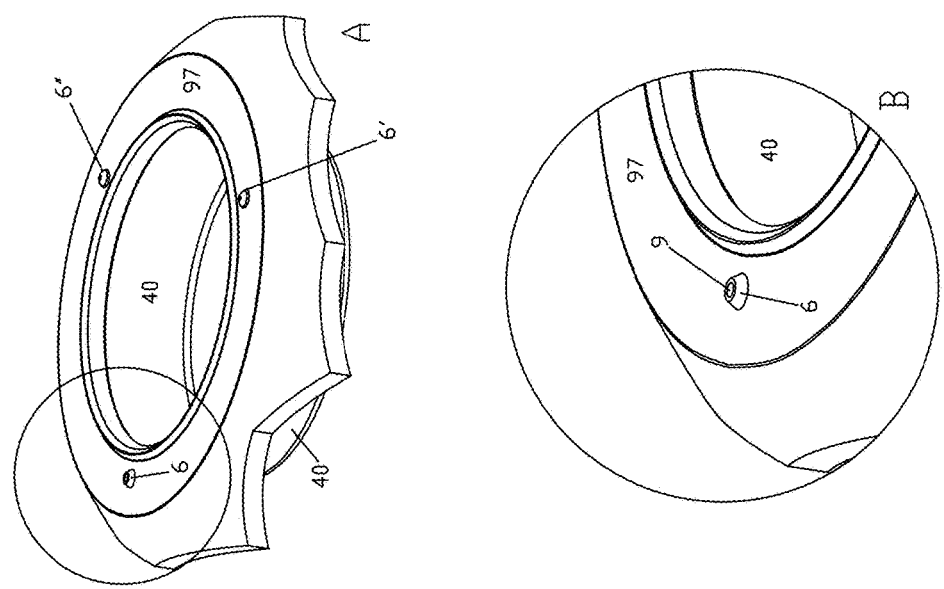
Fig. 37

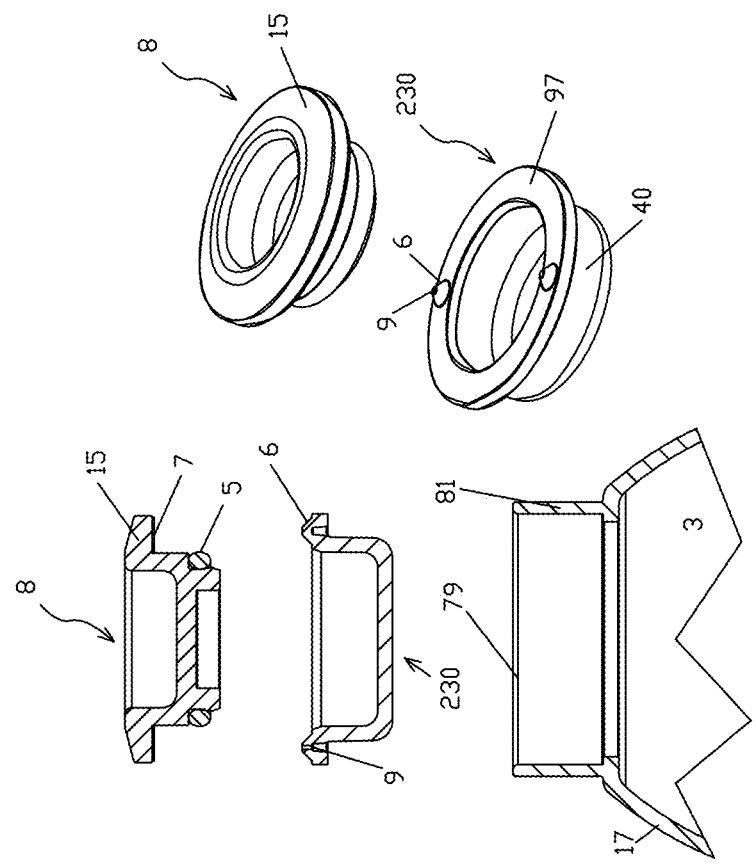
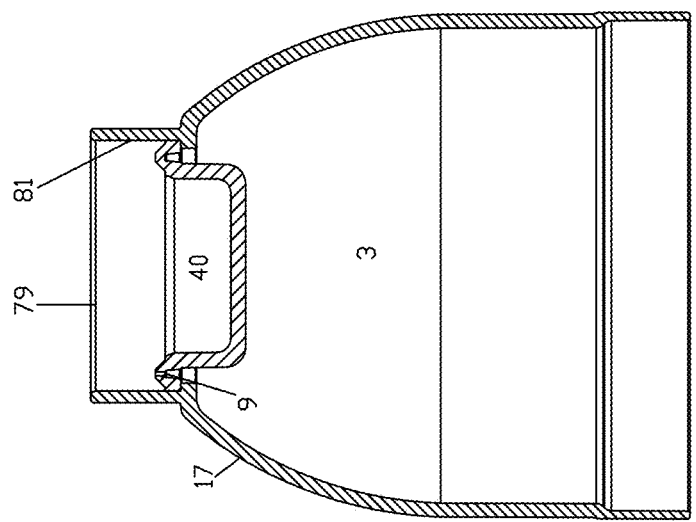
Fig.39

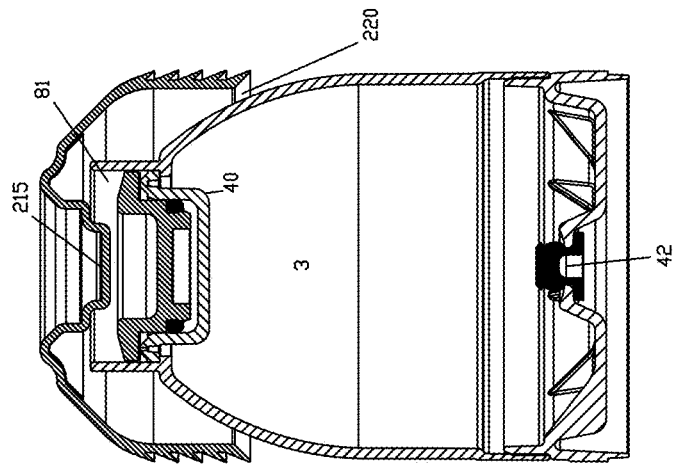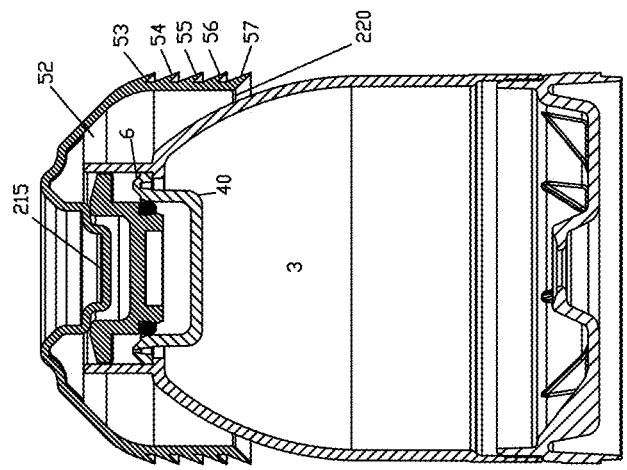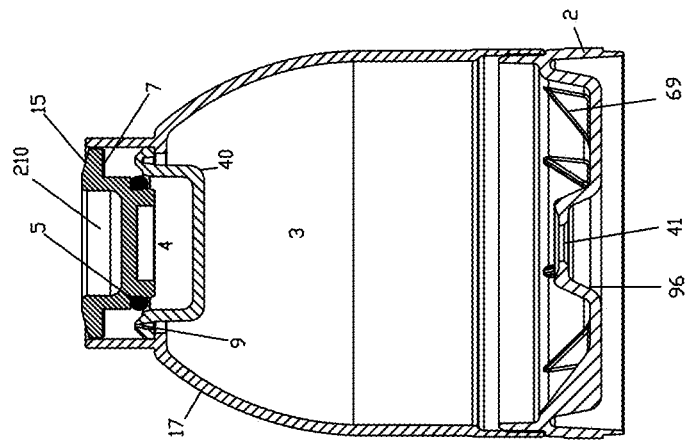
Fig. 40

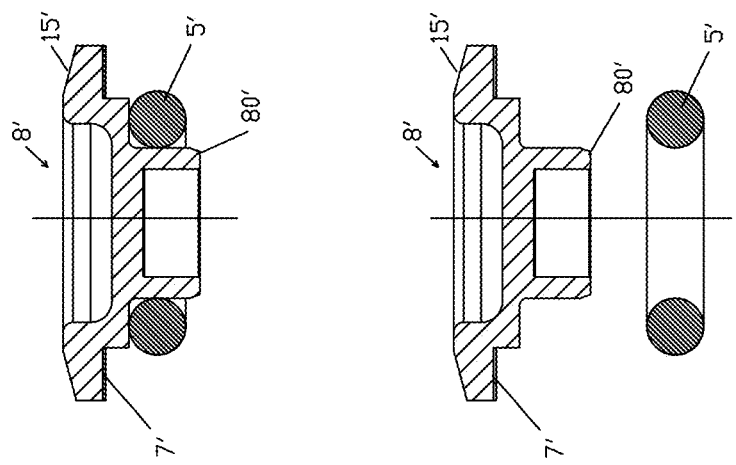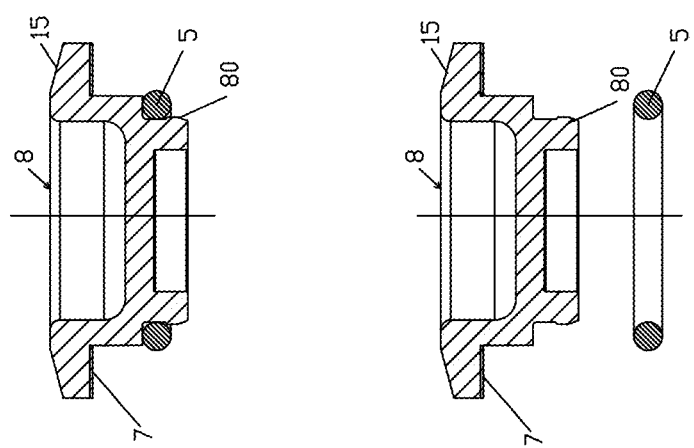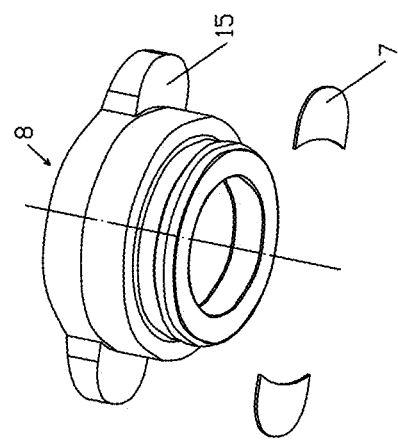
Fig.41

Figure 46:
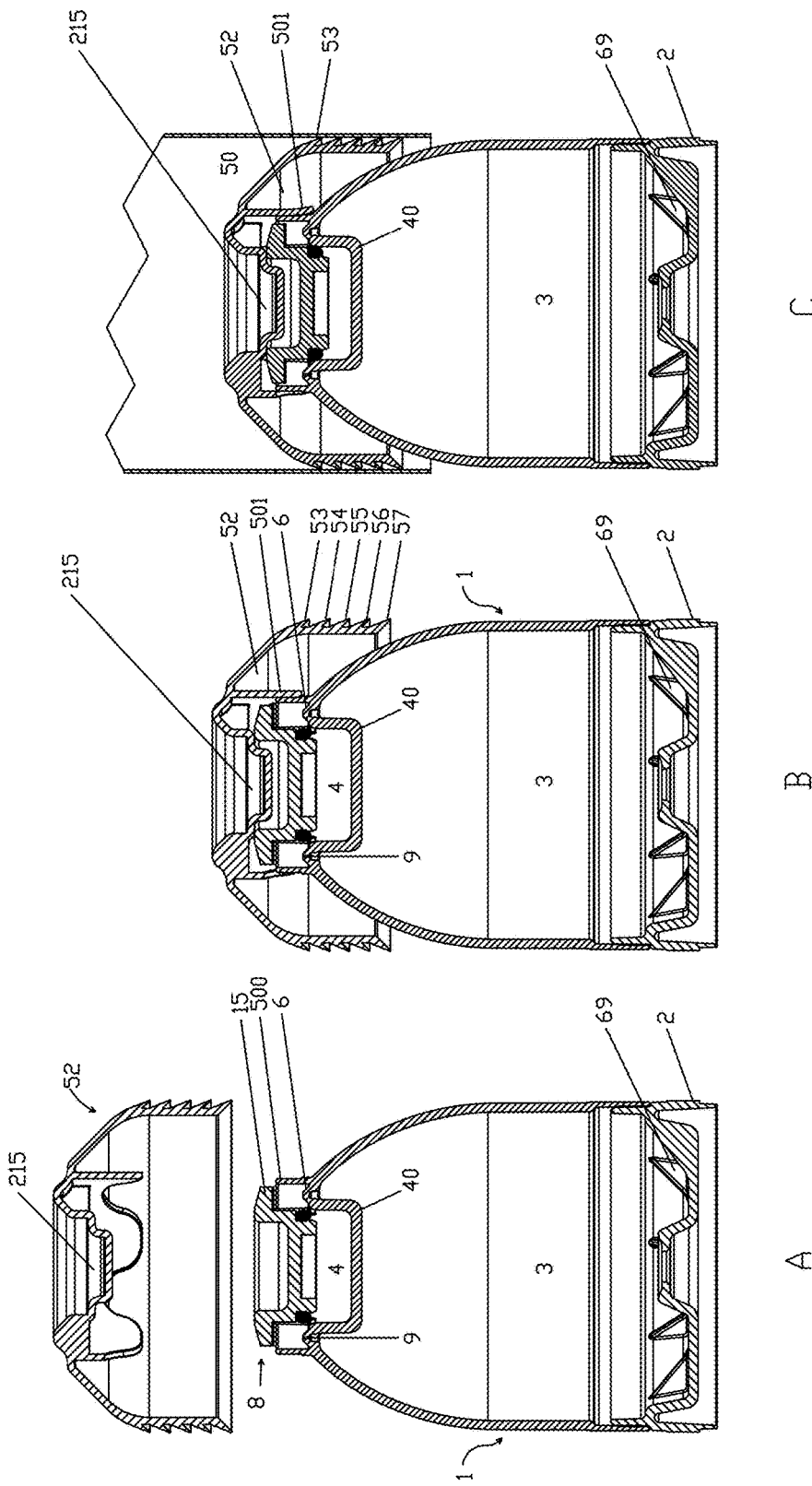

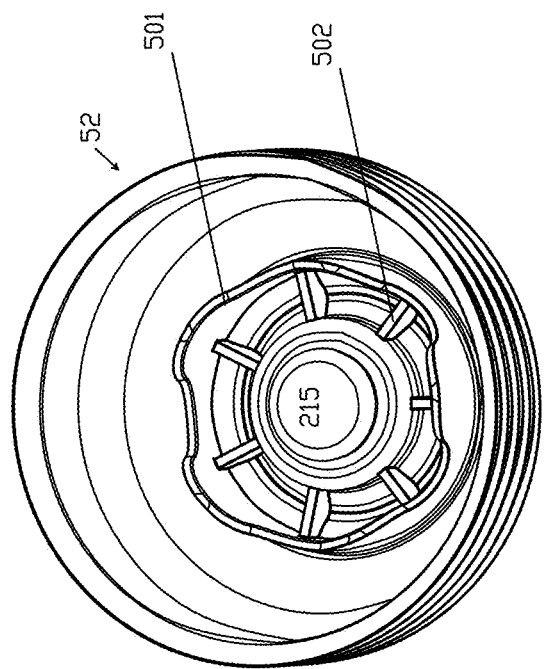
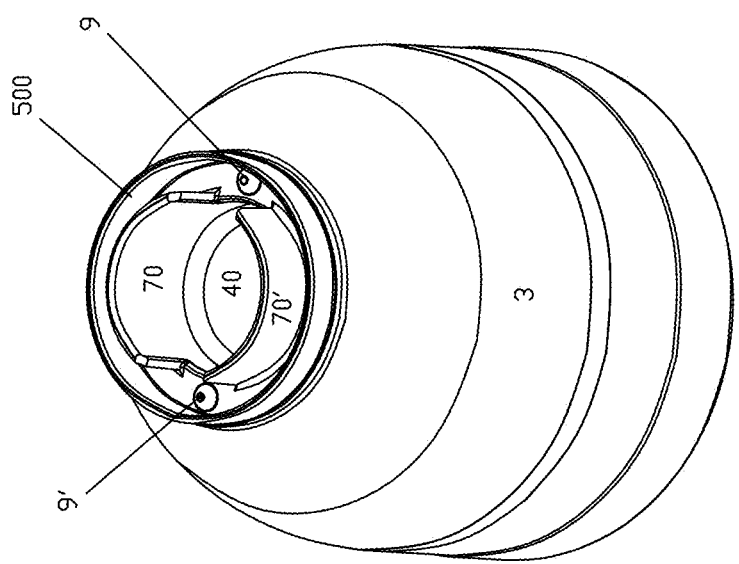
Fig46(1)

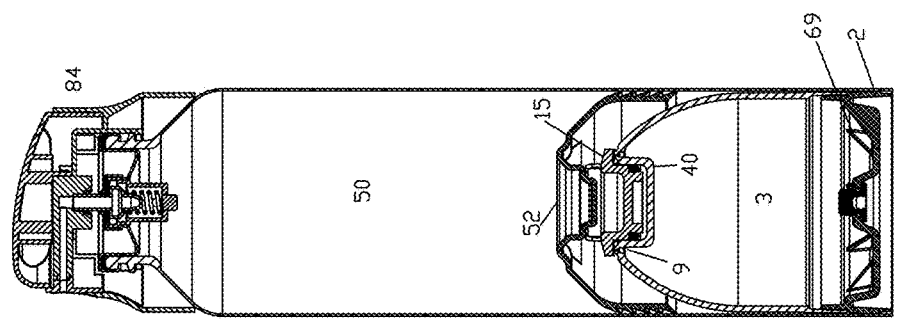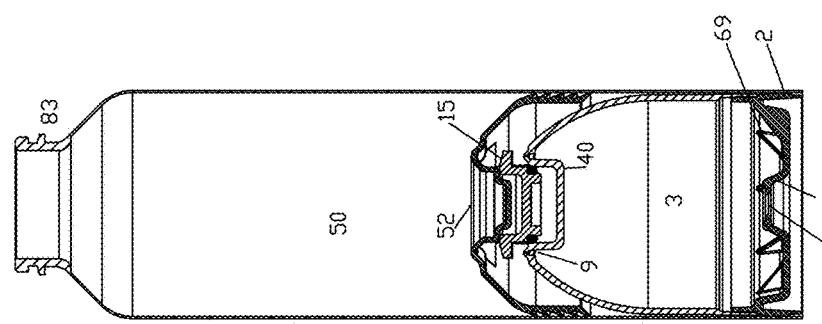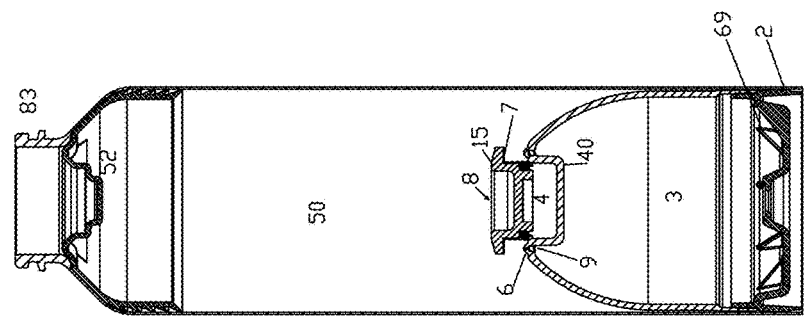
Fig. 47

PRESSURE CONTROL DEVICE, DISPENSER COMPRISING SAID PRESSURE CONTROL DEVICE AND METHOD OF MANUFACTURING

TECHNICAL FIELD

The present invention relates to a pressure control device for maintaining a constant predetermined excess pressure in a fluid dispensing container. The present invention further concerns a method for manufacturing a pressure control device according to an embodiment of the invention. The invention is of particular importance in the technical fields of aerosol sprays. This type of spray finds uses in foam dispensers, toiletry articles, and cosmetics.

Devices of the invention are particularly useful as replacements for systems based on chlorofluorocarbon propellants, mixtures of volatile hydrocarbons or ethers, as they can provide a more environmentally friendly alternative based on compressed air or inert gas. Preferably the container is plastic; it can also be an aluminum can.

BACKGROUND

Dispensing devices based on propellants are known. Propellants are damaging to the environment and are being banned. An alternative on the basis of pressurized air was recently introduced to the market. This pressure control system as described for instance in EP 1 725 476 comprises a pressure control device and a fluid dispensing container. The pressure is controlled by means of a valve mechanism wherein a stem with a broader cylindrical end portion protruding from a piston is used to dynamically open or close a sealing material. The valve mechanism of this type of dispenser is sensitive to damage, among others at the assembly stage, which can lead to instabilities in the working pressure, causing the system sometimes to fail. In addition, this mechanism is made out of a large number of parts and requires a labor intensive production process. Hence, improvements are desired.

It is an object of the present invention to provide a pressure control system which is less sensitive to malfunction and consequently more reliable. It is another objective to reduce the number of parts and reduce the number of steps in the production process, making the process and device less expensive.

SUMMARY OF THE INVENTION

Against this background the invention provides in a pressure control device for maintaining a constant predetermined pressure in a container according to claim 1.

The pressure control device of the invention is characterized by an open/close mechanism that is located outside of the cylinder housing the stopper but it is controlled by the stopper movements and consequently is under control of the reference pressure. The concept provided has less parts and is less complex than prior art systems. It is therefore cheaper and makes mass production accessible.

A main advantage of the present invention is that the pressure control device can be pressurized after implementation and filling of the liquid dispensing bottle. Since the second chamber is encompassing the first chamber, a very compact pressure control device will be obtained so that the total usable space in the bottle is much larger as in known embodiments. As the pressure control device can be fabricated in advance and can be implemented easily in existing plastic bottles, the existing production and filling procedures can be maintained. As less parts are required for the assembly, cost savings can be realized. This provides further economic and ecological benefits.

In another aspect, the invention provides a pressure control system comprising a fluid dispensing container and a pressure control device according to an embodiment of the invention, in accordance with claim 11.

In a further aspect, the invention provides in a method for maintaining a constant predetermined pressure in a fluid container, in accordance with claim 15.

In a further aspect, the invention provides in a method for manufacturing a pressure control system according to an embodiment of the invention, according to claim 16.

Further advantages of the invention are disclosed in the dependent claims and in the following description in which an exemplified embodiment of the invention is described with respect to the accompanying drawings.

FIGURES

FIGS. 1 and 3 are graphic representations of pressure control devices (1) according to an embodiment of the invention, wherein a fluid communication channel (9) is provided with an annular protrusion (6) in the form of a hollow needle (26). FIG. 1 depicts the pressure control device (1) in open position; FIG. 3 depicts the closed position.

FIGS. 2 and 4 are a graphic representation of a pressure control device (1) according to an embodiment of the invention, which is additionally provided with a so-called knife (13).

FIGS. 5 to 15 provide three dimensional representations or cross-sections thereof of the pressure control devices (1) of FIG. 1-3 and FIG. 2-7.

Figure 16:
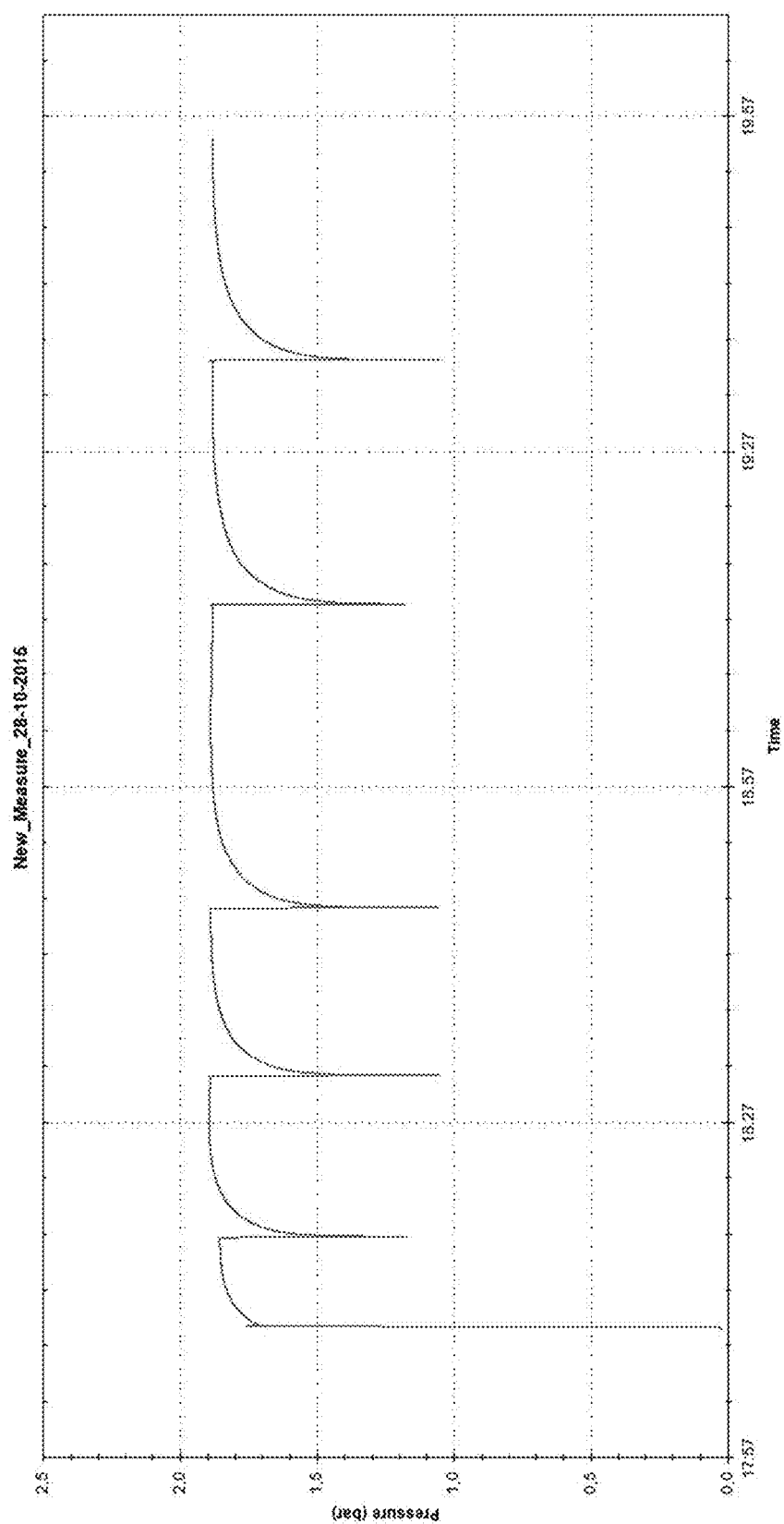
Figure 17:
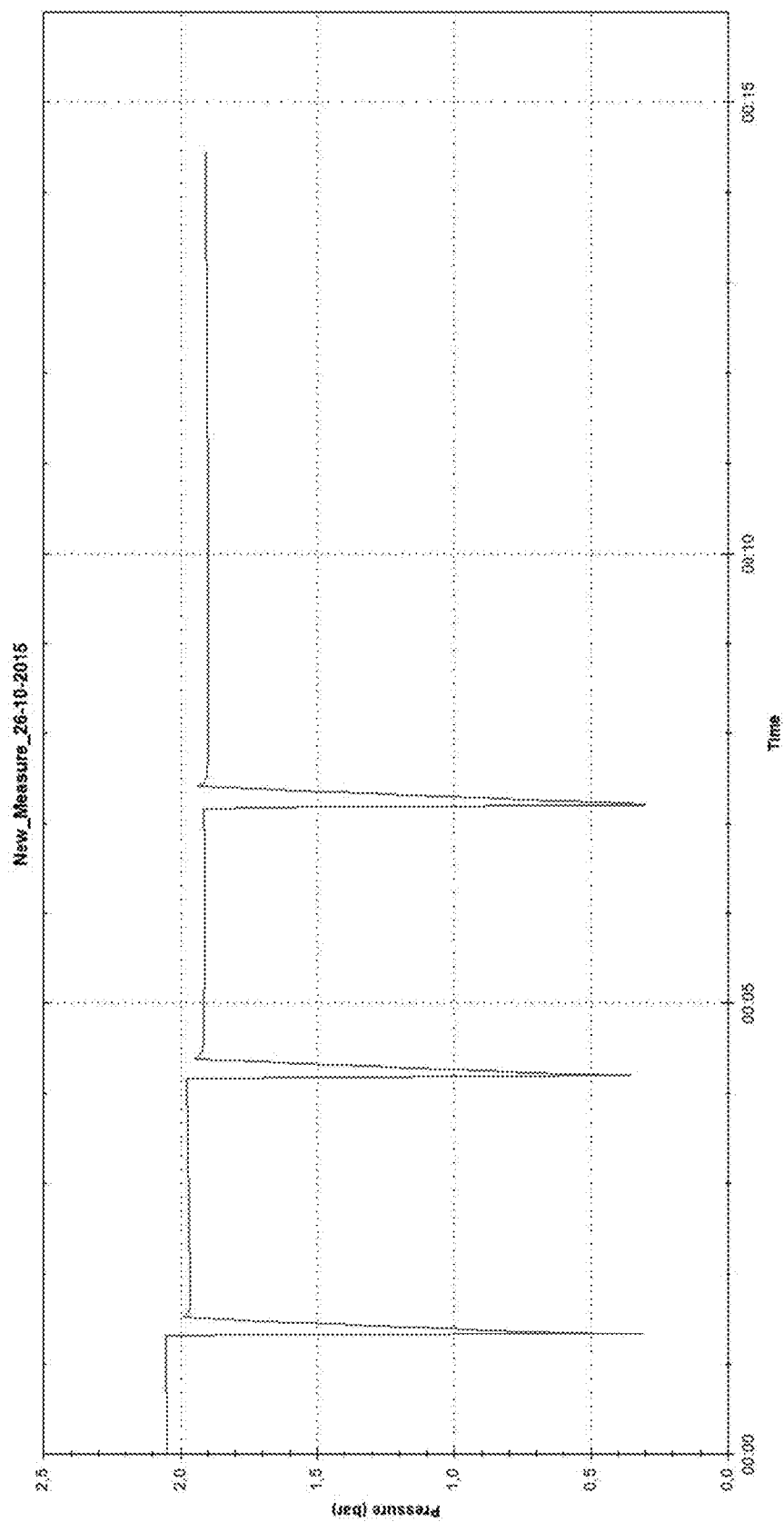

FIGS. 16-17 provide schematic representations of experimental data.

FIGS. 18-49 provide graphic representations of alternative embodiments of the invention.

Figure 50:
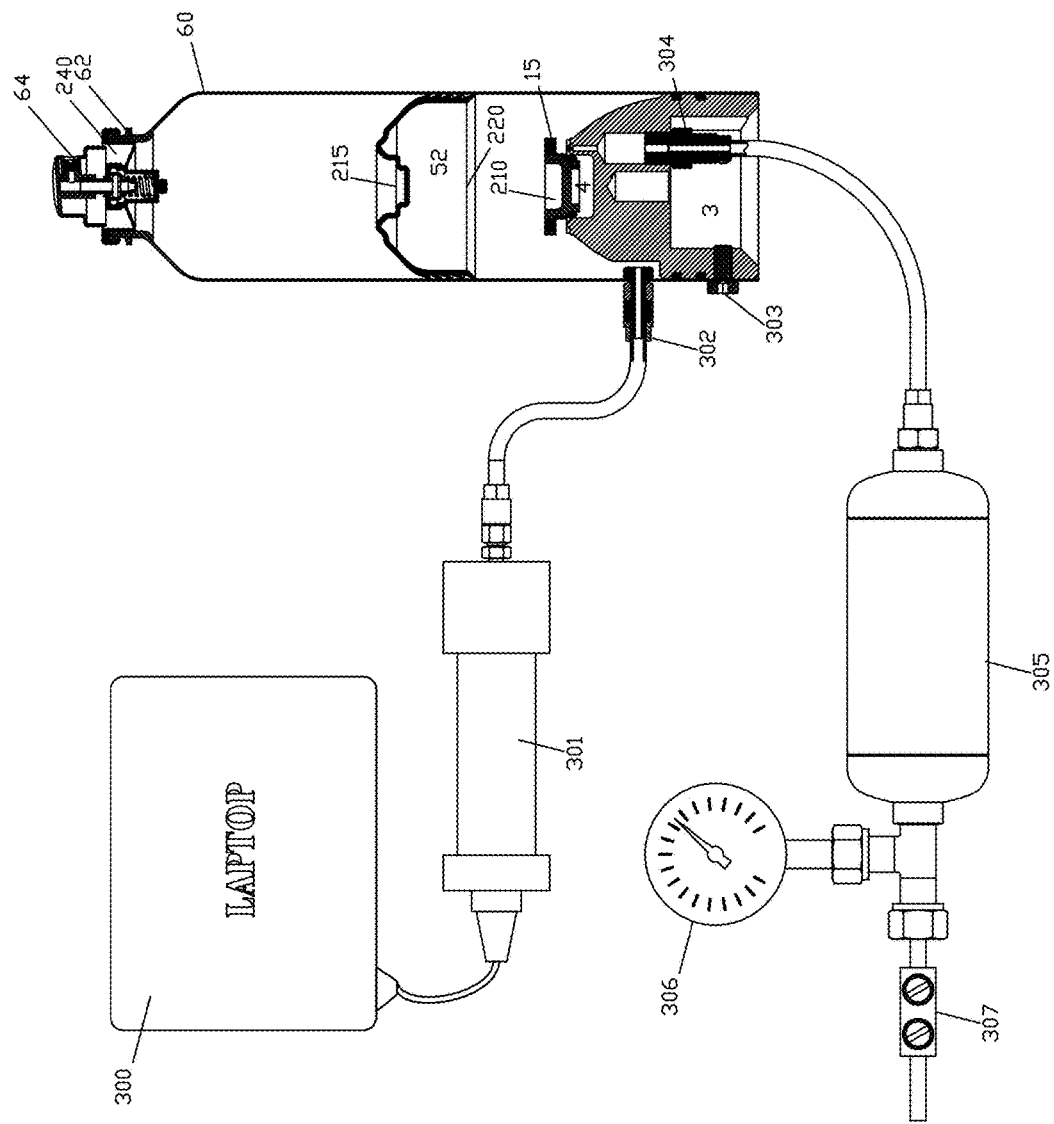
Figure 51:
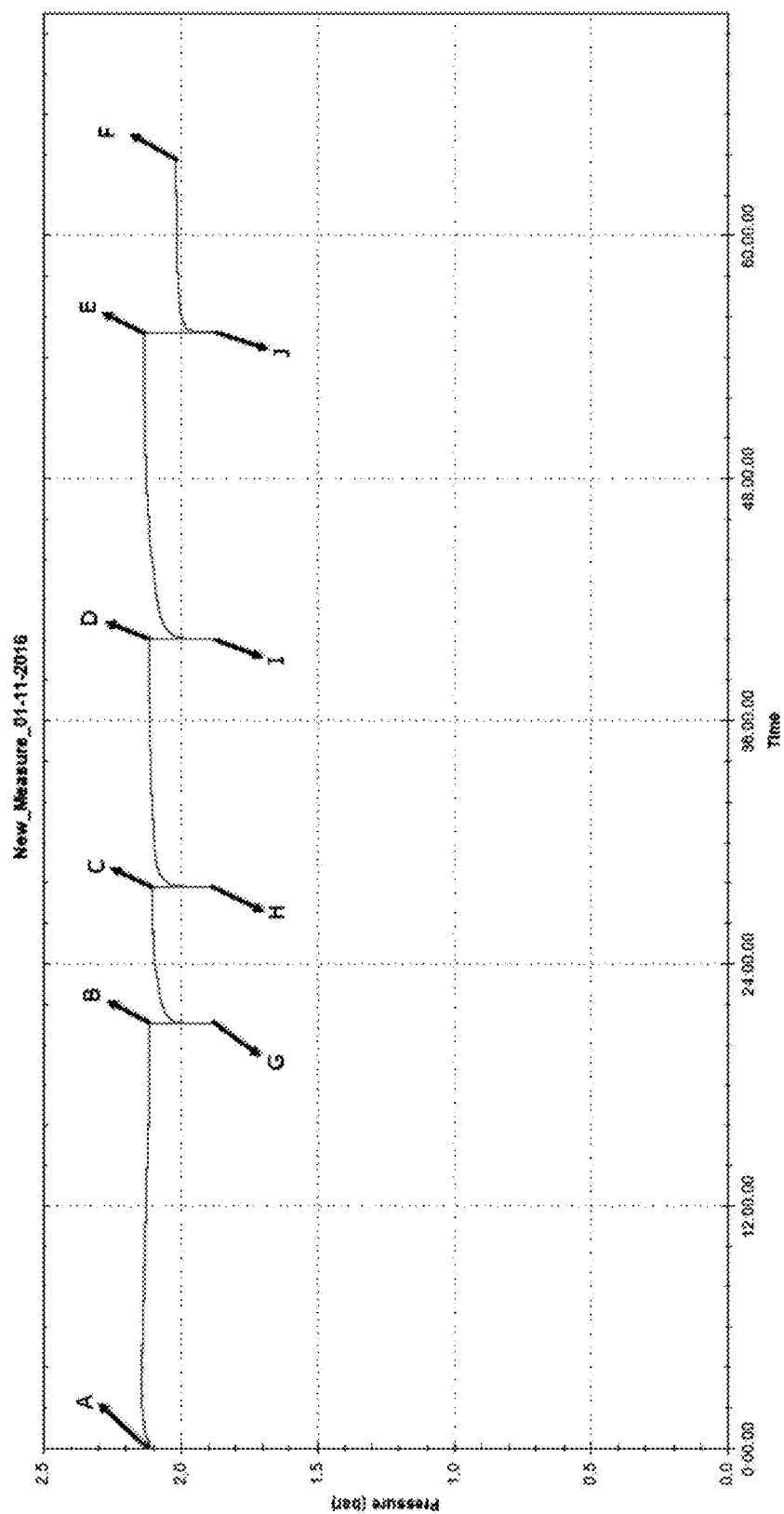

FIG. 50 is a schematic representation of a pressure test, and FIG. 51 graphically displays the result of a pressurization test at 15 bar.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings: "A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed. "Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

With the term "fluid" as used herein is meant a substance, such as a liquid or gas, that is capable of flowing, has no fixed shape, and offers little resistance to an external stress.

The inventors have come up with solutions to overcome problems with the prior art dispensers. The improvement consist in the presentation of a new pressure control device.

In particular, the invention provides in a pressure control device for maintaining a constant predetermined pressure in a fluid container which is arranged for dispensing a fluid contained in the container from the fluid container at said pressure, the pressure control device comprising a cylinder having an open end and a closed end, and a stopper movable within said cylinder to define a first chamber, a second chamber encompassing the cylinder of the first chamber, the second chamber fillable with a gas which in use has a higher pressure than said pressure in the container, at least one fluid connection between the second chamber and the container, and a closing member movable relative to the cylinder for releasing and closing said fluid connection between the second chamber and the fluid dispensing container depending on the position of the closing member relative to the cylinder, the position of the closing member relative to the second chamber being at least dependent on the prevailing pressure in the fluid dispensing container and the prevailing pressure in the first chamber, while in use the fluid connection is released when the pressure in the fluid dispensing container decreases below the predetermined pressure, so that gas flows from the second chamber to the fluid dispensing container and the pressure in the fluid dispensing container increases until the fluid connection is closed by the closing member as a result of the increased pressure in the fluid dispensing container, characterized in that, said fluid connection is provided outside of said cylinder and facing said closing member.

In a preferred embodiment, said fluid connection is an opening in the wall of the second chamber facing the fluid container and said opening is provided with a circumferential protrusion extending from the outer side of the wall towards the fluid dispensing container.

In another preferred embodiment, a protrusion is provided on the closing member for acting on said fluid connection.

The provision of a protrusion is advantageous as it provides for an easy lift of the closing member when the pressure in the container drops. The device is not based on a valve mechanism involving a stem on which the compressed air in the pressure reservoir acts. As much as 8 bar pressure may act on a stem of the prior art pressure control device (1 bar=$10^5$ Pa).

In a preferred embodiment the protrusion extends by 0.2-1.0 mm, more preferably 0.3-0.8 mm from either the outer side of the wall or from the closing member. In a more preferred embodiment the protrusion extends by 0.4-0.7 mm. Most preferably the extension is 0.6 mm.

When positioned on the wall of of the second chamber, i.e. the pressurizable vessel, the protrusion is present around the opening provided by the fluid connection. The protrusion is without interruptions to avoid leaks, i.e. circumferential.

When positioned on the closing member, the protrusion is not provided with a fluid connection. Preferably a protrusion is present on either side, but alternatively it can also be present on both sides, on the closing means and on the second chamber.

In a preferred embodiment the protrusion is a knob, a frustoconical shape, a cubic or rectangular shape, such as provided by a needle. In fact any shape that provides a small surface and is suitable for closing off the fluid connection is suitable. A needle preferably has a diameter of 0.1-2.0 mm; more preferably 0.1-0.5, even more preferably 0.3-0.45 mm, typically 0.40 mm.

Where the fluid connection is provided with a protrusion, it is a circumferential protrusion, i.e. it runs around the opening without interruptions. This prevents leaks.

In a preferred embodiment of a pressure control device according to the invention, said annular protrusion is formed by a hollow needle inserted in the fluid connection. In a preferred embodiment of a pressure control device according to the invention, said annular protrusion is formed by a knob with an opening in communication with said fluid connection.

In a preferred embodiment, the cylinder and fluid connection are an integral part of the second chamber. The provision of a single part has the advantage that they can be manufactured in a single operation, i.e. by injection moulding. Would they be provided in separate parts, than separate manufacturing steps are required. This also has the advantage that less parts require assembly. In addition, the parts would need to be connected to provide a pressurizable second chamber. The skilled person will however understand that this modification also falls within the invention.

In a preferred embodiment of the invention, the cylinder and/or fluid connection are provided as an insert. This has the advantage that the drilling of holes to provide a fluid connection can be done separate from the manufacturing of the second container. In case of quality failures, only a smaller part needs to be discarded and not the entire second chamber with cylinder and fluid connections.

In a preferred embodiment of the invention, said stopper comprises a collar or one or more collar parts, preferably two collar parts, for actuating said fluid connection; preferably for actuating said circumferential protrusion. Preferably the collar or one or more collar parts and/or the stopper neck, or the stopper, are provided with or are made from elastomer material.

In a preferred embodiment of a pressure control device according to the invention, said stopper comprises a rim part or collar provided with an elastomer material for actuating said circumferential protrusion. Preferably said elastomer material is a silicone or a rubber material. This type of material is deformable which is advantageous to close of said opening. Alternatively, a tape material can be used.

With the term elastomer as used herein, is meant a rubbery material composed of long chainlike molecules, or polymers, that are capable of recovering their original shape after being stretched to great extent-hence the name elastomer, from "elastic polymer". Elastomers are polyisoprene, the polymer constituent of natural rubber and synthetics, such as styrene-butadiene rubber, butadiene rubber, acrylonitrile-butadiene copolymer (nitrile rubber), isobutylene-isoprene copolymer (butyl rubber), polychloroprene (neoprene), polysulfide (Thiokol), polydimethyl siloxane (silicone), fluoroelastomer, polyacrylate elastomer, polyethylene (chlorinated chlorosulfonated), styrene-isoprene-styrene (SIS, styrene-butadiene-styrene (SBS) block copolymer, EPDM-polypropylene blend. Advantageously said elastomer material is an acrylonitrile butadiene rubber (NBR). It has the advantage of being air tight. Another preferred elastomer is a fluoroelastomer, commercialized under the trade name Viton.

In a preferred embodiment said elastomer material has a Shore A hardness of 50-95, more preferably 60-90, even more preferably 65-80, most preferably 70. Preferably an acrylonitrile butadiene rubber material of Shore A hardness 70 is used or a fluoroelastomer of Shore A hardness 75. The Shore A scale is used to measure the hardness of elastomers, rubber-like materials, and plastomer materials like polyurethane. The higher the number the harder the material. The method of measurement using a durometer is described in standard ISO 7619-1:2010

Preferably the collar has one or more collar parts, preferably two. The number of collar parts is at least one, preferably two. This provides material savings compared with a stopper where the collar is circumferential with the stopper neck. The material savings are on the part of the stopper material but also on the part of the closing member. The closing member material can be very well positioned and can be kept very locally. This means that no expensive O-ring is required. Instead this can be replaced with a locally positioned seal as a small cylinder, a ball or even a piece of tape.

In a preferred embodiment the stopper is produced using a two component injection moulding process, where very locally a small amount of sealing polymer can be injected, such as silicon or NBR. Even more preferred, since the fluid connection is very small, the entire stopper can act as a closing member. This has the advantage that a separate closing member need not be added to close the fluid connection as the stopper itself serves as closing member.

More preferably one or more guiding means are provided for guiding of said one or more collar parts. The number of guiding means is at least one, preferably two. This is advantageous for positioning of the stopper into the cylinder.

In a most preferred embodiment, a stopper having two collar parts, and a cylinder provided with two guiding means for said two collar parts are used in combination.

An embodiment wherein the second chamber is equipped with an interrupted circumferential wall towards the fluid dispensing container and at the same time the stopper is equipped with radial extending protrusions, in the form of "ears", that fit in the interruptions of that wall, is highly advantageous.

This combination of protrusions, wall and wall interruptions is preferably shaped in such a way that there is a well-designed fit between the parts. This allows the combination to act as a straight guiding mechanism when the stopper is actuated. This straight guiding mechanism prevents the stopper from tilting. When tilting would happen, this would cause an uneven actuating path of the stopper, a potential propellant leakage during actuation or even prevent the stopper from actuating at all. As this has a severe negative impact on the precision and effectiveness of the pressure control device, it is advantageous to be able to avoid this.

Preferably the stopper neck is made of a sealing material or is provided with a sealing material; preferably the bottom part of the neck is provided with a sealing material. The sealing material can be an O-ring or an X-ring or halve of an X-ring. In the latter case the flat surface side is directed towards the neck portion of the stopper. Use of an X-ring is preferred over an O-ring because curling of the ring due to the movement of the stopper can be avoided.

In an embodiment, a pressure control device of the invention is provided with two O-rings, one in the collar of the stopper for sealing of the fluid connection and the other in the bottom part of the neck of the stopper for sealing of the first chamber. Preferably the O-ring at the stopper bottom is treated to reduce friction. A Teflon spray can be applied to a lay a film on the ring in order to reduce friction. As this is an expensive step, it is beneficial to be able to avoid it.

In another embodiment, a pressure control device is provided with a flat sealing material and an O-ring, wherein the flat sealing material is provided in the collar of the stopper for sealing of the fluid connection and the O-ring is provided in the bottom part of the neck of the stopper for sealing of the first chamber.

In yet another, and most preferred embodiment, a pressure control device is provided with a flat sealing material and an X-ring, wherein the flat sealing material is provided in the collar of the stopper for sealing of the fluid connection and the X-ring is provided in the bottom part of the neck of the stopper for sealing of the first chamber.

The sealing material or O-ring that is provided in the collar of the stopper, can be attached to the stopper or can be provided to move around the neck of the stopper and act as a liquid barrier. The benefits of this embodiment are explained under FIG. 34.

In another embodiment the sealing material is applied with 2K injection molding. Alternatively, the neck as a whole is made from sealing material.

Preferably the neck is provided with two or more protrusions, preferably equally divided over the circumference of the neck, and the container is provided with receiving means for said two or more protrusion, such that the stopper can move between a first position I wherein the collar part closes off the fluid connection and a second position II wherein the collar part opens the fluid connection.

In a preferred embodiment of a pressure control device according to the invention, the first and second chamber are of plastic, preferably polyethylene terephthalate, abbreviated as PET, or polyethylene furanoate, abbreviated as PEF. Preferably the stopper is also of polyethylene terephthalate or polyethylene furanoate, which is advantageous for recycling of the components of the pressure control device and system. In another embodiment the stopper is of polyoxymethylene (POM). The advantage of POM is that the hard material is less sensitive to expansion within the usable temperature range.

In a preferred embodiment of a pressure control device according to the invention, said first chamber has a diameter of 15.0-30.0 mm, preferably 18.0-28.0 mm, more preferably 20.0-25.0 mm, most preferably 22.0-24.0 and/or said stopper from said first chamber has a height h of 5.0-15.0 mm, preferably 7.0-13.0 mm, more preferably 8.0-12.0 mm, even more preferably 9.0-11.0 mm, most preferably 10.0 mm. These relatively large diameters have the advantage that friction on the sealing means, in particular on an O-ring, are minimized.

The second chamber is preferably of transparent plastic. It can comprise a transparent plastic bell and a non-transparent, for instance black, bottom part. This is advantageous as it allows the bottom part to be welded to the upper part by laser welding. The black part is laser energy absorbing, whereas the upper part is not.

In a preferred embodiment of a pressure control device according to the invention, said wall of the first chamber facing the fluid container is provided with a knife-shaped protrusion arranged concentrically around the container of the first chamber and positioned between the container wall and said fluid connection and the protrusion is of equal height H as the annular protrusion of the fluid connection.

In another preferred embodiment of a pressure control device according to the invention, the device is provided with one or more of the following features: a liquid barrier, a venting means.

A liquid barrier in combination with dip-tube aerosol container is advantageous, especially with low viscosity products. Otherwise the low viscosity product could enter the fluid connection. In case were a liquid barrier is used, liquid is prevented from entering the second chamber, even when the stopper is in "open" position wherein the closing member is not closing off the fluid connection. In a preferred embodiment the liquid barrier consists of a flat piece of sealing material that is partly attached to the pressure vessel. This allows pivoting movement of the sealing material allowing the fluid connection to open and close. More preferred, attaching is done by welding such as laser welding or ultrasonic welding or by glueing.

The introduction of venting means in the pressure control device, has the advantage that it allows assembly of the parts of the device in such a way that the first chamber stays open, i.e. in contact with the atmosphere, not pressurized but at ambient pressure. This is opposed to the "closed" position, where the first chamber is closed with a sealing member and thus exposed to its own internal reference pressure.

This has some major advantages. As long as the pressure control device is "open" it is less sensitive to external manipulations like further assembly, transport or storage. If the pressure control device would be closed, these manipulations could cause differences in the stopper reference position or pressure. for example, it is not unusual that between assembly and filling, the empty devices are stored for an extended period of up to one year or more. The embodiment of the present invention with venting means, allows the first chamber to be "closed" on the moment of filling.

Defining elements for this are the one or more venting means. They can be positioned in the upper part of the cylinder of the first chamber. These venting means provide local interruptions in the cylindrical wall of the first chamber. The stopper that moves in the cylinder is equipped with a sealing mechanism, for instance an O-ring, that has a certain diameter pretension with the cylinder to achieve the closing of the first chamber. By interrupting the upper part of the first cylinder with venting means, the sealing mechanism of the stopper still has the pretension with the cylinder to hold it mechanically in place, but it doesn't seal due to the venting means. This allows the stopper to be assembled and mechanically held in place, while keeping the first chamber open to ambient pressure. Only when the stopper is pushed further into the cylinder, to a position below the venting means, it will effectively seal the first chamber.

Figure 45:
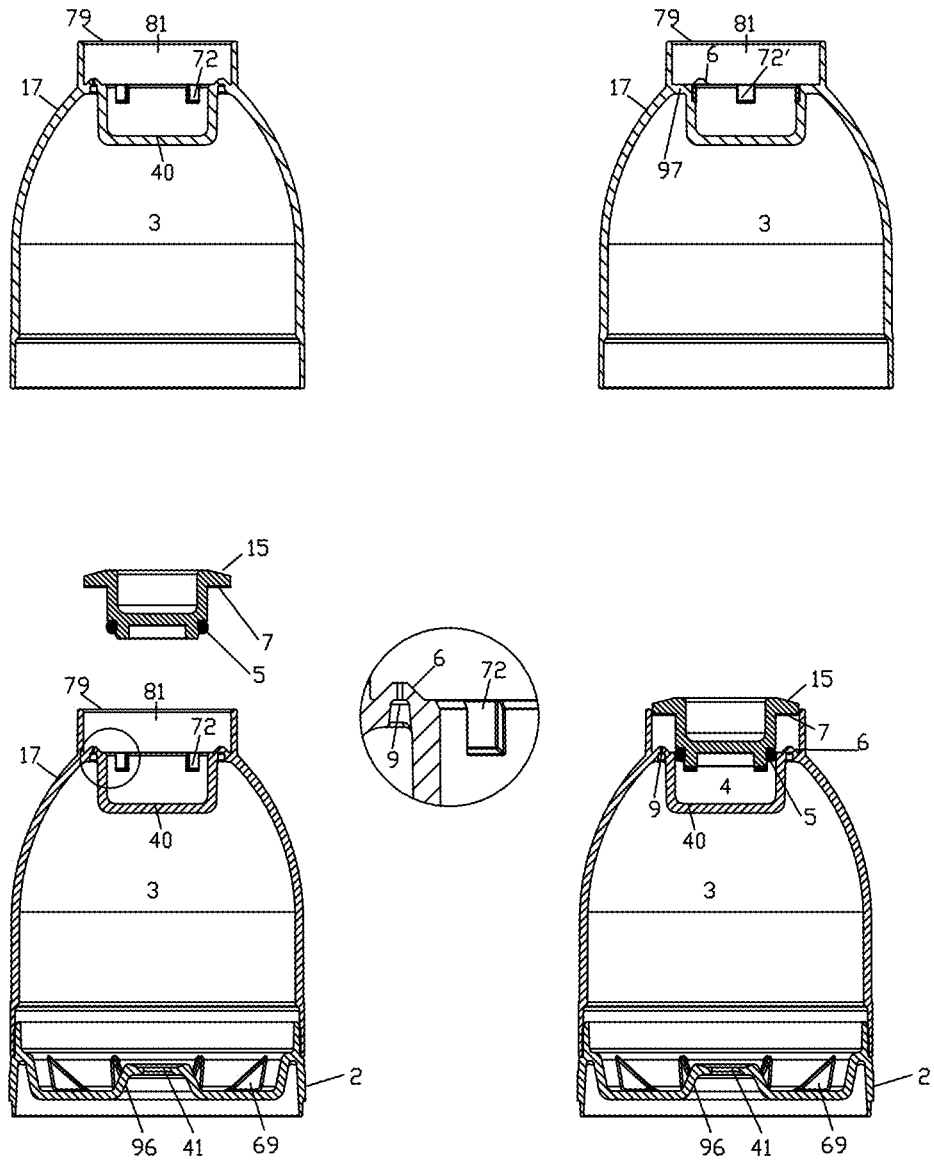

These venting means can occur under different forms and in different numbers. A minimum of one venting means is needed, preferably two or more. Venting means can occur as a groove in the upper part of the cylinder wall, such as illustrated in FIG. 45. But when the cylinder wall is extending above the top of the second chamber, they can also occur as an opening in the cylinder wall. A particularly preferred embodiment, is as displayed in FIGS. 41 and 43. The cylinder wall is extending above the second chamber, where it is interrupted two times. A special stopper with two rim parts fits between the interruptions. The walls and interruptions of the extended cylinder have the advantage of guiding the stopper.

In another aspect, the invention provides a pressure control system comprising a fluid dispensing container and a pressure control device according to an embodiment of the invention. The container can be a plastic container, preferably PET or a metal can. Preferably the PET container is obtained by injection stretch blow moulding. Injection stretch blow moulding comprises the following steps: injection moulding a pre-form, stretch blow moulding the pre-form into a container form, cutting off the bottom part to obtain a container with opening at the bottom. Said container with opening can be placed over a pressure control device of the invention.

Alternatively the container can be made from different biaxially stretchable plastics, such as polyethylene naphthalate (PEN), polyethylene-coisosorbite terephthalate (PEIT), polyethylene furanoate (PEF), polytrimethylene furandicarboxylate (PTF), high density polyethylene (HDPE), polypropylene (PP), polyamides, polystyrene, polyvinylchloride (PVC), cyclic olefin copolymer (COC).

In another embodiment the container could be made by an extrusion process. In this case a tube body is extruded and cut off at the desired length. This has the advantage that no residual material is cut off, opposed to cutting of the bottom of containers produced by ISBM process. This cut of bottom is a waste which is expensive. If the container tube is produced by extrusion, a separate added neck part needs to be added to allow closing.

In a preferred embodiment, the pressure inside the second container and inside the fluid container have a ratio of 1:4 to 1:3. Typically the pressure inside the second container is 6 to 8 bar and the pressure inside the fluid container is 2 bar.

Typically a dispenser with a content of 200 ml, has a real content of 240 ml fluid and 80 ml propellant. The 80 ml propellant is pressurized to 8 bar. It is capable of delivering 2 bar to drive out the total content of 320 ml and empty the dispenser.

In a preferred embodiment of the pressure control system according to the invention, the fluid dispensing container has a dispensing opening with a dispensing valve, and a movable piston is provided in the container between the pressure control device and the dispensing opening, which piston is separating the fluid and the gas, and which is movable towards the dispensing opening by the excess pressure prevailing in the container.

Preferably the movable piston is designed as a dome with annular ribs. More preferably the movable piston is made of a plastic material.

In another preferred embodiment of the pressure control system according to the invention, the container has a dispensing opening with a dispensing valve, and a dip-tube is provided from the entry of the dispensing valve to the upper end of the pressure control device, in order to dispense the fluid through the dip-tube by the excess pressure prevailing in the container.

In yet another embodiment of the pressure control system, the container has a dispensing opening with a dispensing valve and a bag for holding fluid is provided onto said valve. This bag-on-valve type of packaging can benefit from the combination with a pressure control device of the invention to provide a constant and predetermined pressure for evacuation of the product.

In a preferred embodiment of the pressure control system according to an embodiment of the invention, the dispensing valve has a spray nozzle.

In a preferred embodiment of the pressure control system according to an embodiment of the invention, the system in use is pressurized with compressed air to a pressure in the reference chamber of 0.5-5.5 bar, preferably 1.0-5.0 bar, more preferably 1.5-4.5 bar, ever more preferably 2.0-4.0 bar, most preferably 2.1-3.0 bar. The pressure control system of the prior art is prepared to contain a minimum of 1.7 bar, preferably 2.2 bar pressure so as to deliver 1.5 bar pressure upon a period of storage. The present system has the advantage that it can go above 3 bar; whereas the prior art system is restricted to 2.5 bar. This is beneficial to provide a better product output, e.g. for viscous products. It can also be used to spray further than was previously possible. It is advantageous for sprays to apply a higher pressure because it provides a better spray pattern with improved nebulisation.

In another preferred embodiment of the invention, the pressure in the second chamber is 3.1-5.0 bar, preferably 3.3-4.7 bar, more preferably 3.6-4.5 bar, most preferably 3.8-4.2 bar.

The desired pressure can easily be obtained by either changing the dimensions of the pressure control chamber or the height of the protrusion surrounding the fluid connection. Preferably the pressure control device comprises a container made of plastic, preferably of transparant plastic. Said plastic may consist of polyethylene terephthalate (PET). However, it may also consist of a different plastic such as polyolefins, polyesters, PETG, PBT, PEN, PEIT, PTF or polyethylene furanoate (PEF) or polyamides, polystyrene, PVC or COC, provided it is suitable for pressurization. With an appropriate selection of plastic, unsuitable deformations can be kept under control. For high pressure applications, such as for 15 bar and more, it may be advantageous to add glass fibers to the plastic composition. Injection moulding allows the use of glass fibers, whereas a technology such as blow molding does not.

Preferably the pressure control system comprises a PET fluid dispensing container. According to a further advantageous embodiment of the invention, the fluid dispensing container originates from a preform made from a primary plastic material which is formed by a material which is bi-axially stretchable, particularly PET.

More preferably said container is attached to said pressure control device by welding, preferably by laser welding, more preferably by a double seam, most preferably one of said seams runs circumferentially around the bottom opening of said PET container. Most preferably one of said seams is positioned at the edge of said fluid container.

In a further aspect, the invention provides in a method for manufacturing a pressure control device according to an embodiment of the invention. In particular, this process comprises the steps of:
  forming out of a synthetic material of high stability against deformation by pressure, said second chamber with a cylinder shaped wall for receipt of a stopper provided with a closing member to define a first chamber,
  providing said second chamber with a fluid connection and a bottom opening closable with a closure,
  inserting in the cylinder shaped wall of said second chamber said stopper to define a first chamber,
  mounting the stopper and closing member with respect to the fluid connection such that the communication between the second chamber and outside can be closed.

In a preferred embodiment, said closure is a Nicholson plug. Advantageously it is made of rubber such as nitrile butadiene rubber (NBR).

The second chamber is preferably injection moulded; preferably injection moulded from polyethylene terephthalate (PET). This is a simple, industrially applicable, one step process than can be carried out on large scale.

To obtain the fluid connection, a hole is either drilled into the mould after production or the mould is provided such that a fluid connection is available immediately. The size and shape can be adjusted later, for instance with the provision of an insert.

The second chamber is preferably dome shaped. The curved edges are advantageous to provide a strong, sturdy construction. Less material is required to provide strength compared to a rectangular shaped construction. A dome shaped second chamber is beneficial to fit into the dome shaped piston. Hence, less space is occupied and more space is available for filling the container with product.

According to a further embodiment of the invention, the second chamber is formed by a multi-chamber system consisting of at least two chambers. Each of the chambers can have its fluid connection and closing member for acting on the fluid connection.

In another embodiment, the second chamber is cylinder shaped, wherein the cylinder has a diameter which is smaller than the diameter of the container so that product can be allowed to occupy the space between them. With this configuration, product can be filled to the bottom of the container, covering the pressure control device. The consumer sees a container that is filled with product. It provides the perception that the container is more filled.

The bottom opening is made in the bottom of the second chamber. This can be done by drilling or, which is more advantageous, during the injection blow moulding process in that the outer shape of the moulding tool has a pin at the bottom for shaping the bottom opening. The bottom opening is advantageously located in a central position of the bottom plate.

In yet another aspect, the invention provides in a method for manufacturing a pressure control system wherein a pressure control device manufactured according to an embodiment of the invention is positioned inside a fluid dispensing container; preferably formed from a synthetic material by injection stretch blow-moulding or formed from a metal sheet, preferably an aluminium sheet.

The container or bottle is preferably injection stretch blow-moulded (ISBM) from a proper pre-form made of any suitable plastic material like PET or the like. The pre-form has already the shape of a bottle in a smaller format. Pre-forms may first be made separately on very high output production scale and are therefore very economical. The ISBM process has the same advantages of the abovementioned injection blow-moulding process used for producing the cylinder, but with the additional important benefit in that the plastic material is stretched bi-axially, that is both radially and lengthwise, which gives rise to even better stretch and gas barrier properties even with a thin wall thickness of typically 0.15 to 1 mm depending on the container design. After stretch blow-moulding the end part of the container bottle may be cut-off to provide an open end for receiving the piston and cylinder. The cutting process can provide cylinders with different sizes with the same tooling or with minimal changes.

Preferably said fluid dispensing container and said pressure control device are joined by laser welding.

The bottle with its open end portion is put over the cylinder of the pressure control device. In order to obtain a hermetic seal between the bottle and the cylinder, the bottle is preferably laser-welded to the cylinder. For this reason the bottle is made of a transparent plastic material like PET and the cylinder is at least impregnated at a small distance from the bottle end portion at a ring-cylindrical circumference with an infrared or laser energy absorbing material known as "carbon black". The bottle with the cylinder is turned over its longitudinal axis during a laser beam is directed perpendicularly towards the outer surface of the bottle.

Although laser welding has been proven as giving the best results for joining the pressure control device to the bottle other suitable joining methods, like ultrasonic welding or gluing with an appropriate plastic adhesive can also be used.

The main advantages of the described manufacturing method is that the pressure control device can be produced and its first chamber can be pressurized and delivered to the manufacturer of the container, and the manufacturer can produce the container or bottle by injection stretch blow-moulding, which is a standard known process, cut-off the bottom of the container or bottle, join the pressure control device with the bottle e.g. by laser welding, insert the pressure valve, fill in the liquid over the pressure valve, and finally pressurize the second cylinder through the rubber plug in a conventional manner. The additional production steps can easily be introduced in the known production and filling processes for aerosol containers as used in cosmetics or the like, wherein e.g. the liquid product is filled in through the open neck of the container or through the dispensing valve.

A further advantage of the invention is that, since only normal air or any other suitable inert gas is used for the pressure filling, the process facilities, equipment and manufacturing environment and operating procedures do not need to take account of the special safety requirements normally needed for dangerous flammable propellants.

In a method for manufacturing a pressure control system according to an embodiment of the invention, a pressure control device manufactured according to an embodiment of the invention is positioned inside a fluid dispensing, preferably formed from a synthetic material by injection stretch blow-moulding; said fluid dispensing container is provided with fluid for dispensing; said second container is filled with compressed air and the closure for the bottom opening is mounted in the bottom opening of the second container.

In a further aspect the invention provides in a method for maintaining a constant predetermined pressure in a fluid container arranged for dispensing a fluid contained in the container from the fluid container at said pressure, the method comprising:
  providing a pressure control device according to an embodiment of the invention for delivery of said constant predetermined pressure,
  releasing the fluid connection of the pressure control device when the pressure in the fluid dispensing container decreases below the predetermined pressure, and
  closing the fluid connection when the pressure in the fluid dispensing container reaches the predetermined pressure.

In another aspect the invention provides in a method for manufacturing a pressure control system according to an embodiment of the invention, wherein a pressure control device according to an embodiment of the invention is positioned inside a fluid dispensing container; preferably formed from a synthetic material by injection stretch blow-moulding; said fluid dispensing container is provided with fluid for dispensing; and said second container is filled with propellant, preferably compressed air. This method allows to fill the container first with fluid followed by addition of the propellant. As alternative to compressed air, other propellants can be used such as $N_2$, $CO_2$ or $NO_2$ or liquid propellants such as isobutene or isopentane.

In a preferred embodiment, said said pressure control device is provided with a liquid barrier. This has for effect that the fluid connections are protected against liquid in the filling step. the liquid barrier prevents liquid from entering the second chamber. This is especially advantageous in case of low viscosity fluids. It provides the advantage that the pressure device need not be closed, i.e. closing members are closing off the fluid connection. The stopper can still be positioned in the cylinder in such a way that the first chamber is on atmospheric pressure.

In a preferred embodiment, the method for manufacturing a pressure control system of the invention, comprises the step of: inserting the stopper into a cylinder provided with venting means thereby leaving the first chamber under atmospheric pressure.

As previously described, the use of one or more venting means allows the assembly of the pressure control device in an "open" position, i.e. with the first chamber at ambient pressure. As it is possible to mount the pressure control device in an open position, it also needs to be closed to allow functionality. This "closing" action can occur due to an external force pushing the stopper to its reference position below the venting means in the cylinder of the first chamber. In a specific embodiment, a piston is used to provide the force required to activate the pressure control device, i.e. to move the stopper from open to closed position inside the first chamber. This can be done by shaping the piston and the upper part of the second chamber in such a way that when the piston is pushed down on the pressure control device, it pushes the stopper to its reference position. This requires both specific design elements in the piston, preferably one or more ribs on the bottom of the piston. Preferably the upper part of the second chamber also has a feature to enable activation, such as a ridge on which a piston can push. Preferably the dimensions of this ridge form the reference position of the stopper. In a preferred embodiment this ridge is an extension of the cylinder so that it forms a combination with the interrupted extended cylinder for venting and stopper guiding. The pushing step can take place (1) either during final assembly of the pressure control system, when a piston is placed on top of the pressure control device and they are pushed into the fluid container or (2) either during filling, when a piston is assembled in the top of the fluid container and is being pushed down during the filling process.

In a preferred embodiment, the method for manufacturing a pressure control system of the invention, further comprises the step of: inserting a movable piston onto said pressure control device prior to positioning into said fluid dispensing container or positioning a movable piston inside said fluid dispensing container followed by insertion of said pressure control device.

In a preferred embodiment, the method for manufacturing a pressure control system of the invention, further comprises the step of: joining parts by welding; preferably by laser welding; more preferably a bottom plate is welded to the second chamber; even more preferably both the second chamber and the fluid dispensing container are welded to the bottom plate.

In a preferred embodiment, a fluid container is selected with a wall thickness compared to the wall thickness of said pressurizable vessel of 1:1 to 1:5, preferably around 1:3.

In another preferred embodiment, a method for assembling an aerosol dispenser (100), comprises the steps of:
  providing a pressurizable cylindrical vessel,
  providing a bottom plate for said vessel, attaching said bottom plate to said pressurizable cylindrical vessel;
inserting one or more pressure control means into said cylindrical insert of said pressurizable cylindrical vessel thereby providing a pressure control system,
mounting a fluid container over said pressure control system and attaching it to said bottom plate;
filling said container with a fluid load,
providing said fluid container with a dispensing head, and
pressurizing and closing said pressurizable cylindrical vessel,
thereby providing said aerosol dispenser,
characterized in that, said vessel is permanently connected to said bottom plate by welding and said container is permanently connected to said bottom plate by welding; wherein said welding is executed as a separate step prior to pressurization of said pressurizable vessel or said welding is executed consecutively to said attaching.

In a final aspect, the invention provides in uses of a pressure control device and system according to an embodiment of the invention. A pressure control system according to an embodiment of the invention can be used in aerosol packaging, preferably barrier packaging. By the term "barrier packaging" as used herein, is meant a packaging wherein fluid and propellant are kept separate. Preferably said barrier is provided by a moveable piston or by a bag-on-valve. The device and system of the invention are preferably used in a shaving cream dispenser, an air freshener dispenser, deodorant dispenser, spray paint dispenser. They can also be used for food, feed, beverages, house hold products, cosmetics and pharmaceuticals.

The examples which follow illustrate the invention without limiting it.

A first embodiment of a pressure control device (1) according to the invention is provided in FIGS. 1 (open position) and 3 (closed position). The pressure control device (1) for maintaining a constant predetermined pressure in a fluid container (not depicted) comprises a container shaped wall in the form of a cylinder (40) having an open end and a closed end, and a stopper (8) movable within said cylinder (40) to define a first chamber (4). A second chamber (3) is encompassing the cylinder (40) of the first chamber (4). It is fillable with a gas, preferably compressed air, which in use has a higher pressure than the pressure in the fluid container (not depicted). At least one fluid connection (9) is provided between the second chamber (3) and the fluid container. A closing member (7) movable relative to the first chamber (4) for releasing and closing said fluid connection (9) is provided between the second chamber (3) and the fluid dispensing container. The position of the closing member (7) relative to the second chamber (3) is at least dependent on the prevailing pressure in the fluid dispensing container and the prevailing pressure in the first chamber (4). In use the fluid connection (9) is released when the pressure in the fluid dispensing container decreases below the predetermined pressure, so that gas flows from the second chamber (3) to the fluid dispensing container and the pressure in the fluid dispensing container increases until the fluid connection (9) is closed by the closing member (7) as a result of the increased pressure in the fluid dispensing container. Said fluid connection (9) is characterized by an opening in the wall of the second chamber (3) facing the fluid container and said fluid connection (9) is provided with a circumferential protrusion (6) extending from the outer side of the wall towards the fluid dispensing container by a height H of 0.1-2.0 mm.

FIGS. 2 and 4 are a graphic representation of a pressure control device (1) according to an embodiment of the invention, which is additionally provided with a so-called knife (13).

Figure 5:
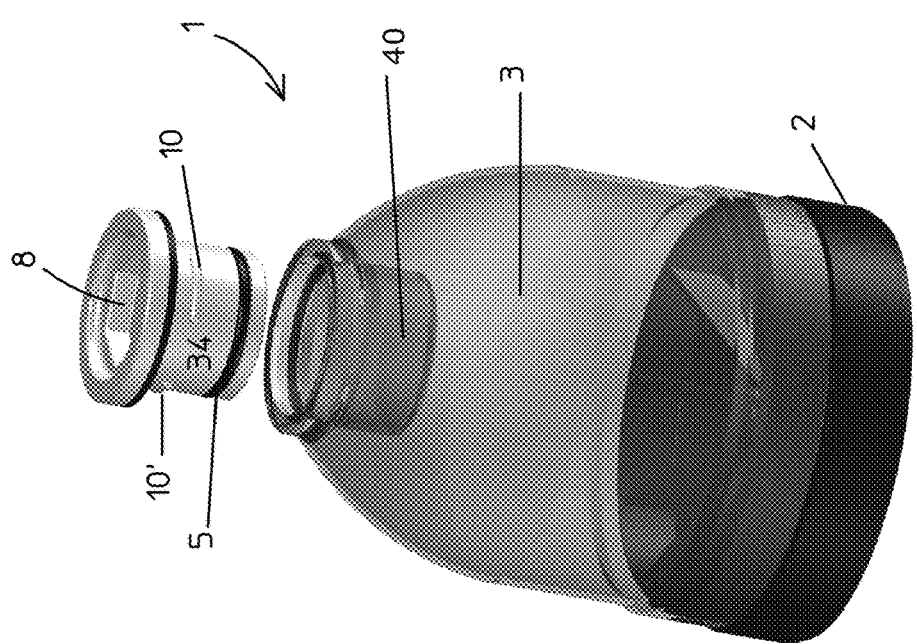

As depicted in FIG. 5, the system comprises a bottom plate (depicted in black; 2), a pressure container or reservoir (3) with a collecting basin (depicted as transparent; 40) and a form fitting stopper (depicted in white; 8). Parts and where they are located: operation guidance chamber: =the complete space above the stopper (white area, ref nr 8); conducting chamber (40): =the space wherein the stopper is brought in; pressure (control) room (4): is part of the conducting chamber (40) and is the space from the O-ring (in which the stopper is located) to the bottom of the conducting chamber; pressure reservoir (3): =space between the conducting chamber (40) and the bottom (2).

Figure 6:
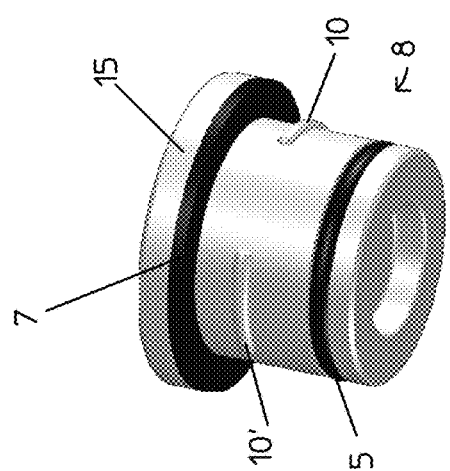

In FIG. 6 a three dimensional representation of the stopper (8) is depicted. The stopper comprises a neck (34) and collar (15). Beneath the collar (15) a closing member (7) is provided. At the bottom of the neck (35) a recess (71) is provided in which an O-ring (5) is provided. Underneath the collar (15) the neck of the stopper is provided with three profiled protruding stripes (10). On the depicted stopper three profiled protruding stripes (10) are provided on the circumference of the stopper neck (34). These are placed at a regular distance from each other. The stopper (8) is executed in plastic. It can be manufactured by injection moulding. The O-ring (5), executed in a silicon, a rubber or other elastic and closing material, is preferably produced simultaneously with the stopper (8).

Figure 7:
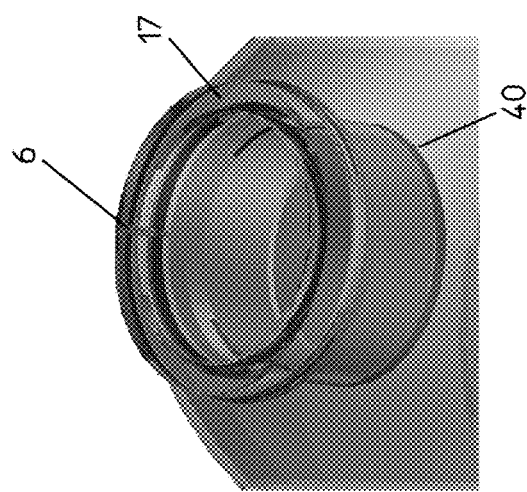

In FIG. 7 a three dimensional representation is provided of the guidance chamber formed by the container shaped wall (40) of the pressure reservoir (3). This is form fittingly executed with the stopper (8) and provides among other for the receipt of the stopper (8). The guidance chamber (40) is provided with a basin with raised edge. The edge is at least provided with a fluid connection (9). Preferably this air channel is provided with a hollow needle (26). The hollow needle (26) is slightly protruding above the edge, for instance 0.3 mm. Alternatively, the hollow needle (26) can be replace by a small sphere, or nob/protrusion in the form of a cross section of a sphere, with opening.

In case several fluid connections (9) are provided, then they are preferably equally spread over the circumference of the chamber rim (17). The fluid connections (9) connect the volume of the pressure chamber with the volume of the operation guide chamber.

Underneath the upper rim (17) the guidance chamber is provided with a collar with grooves (11). These are form fittingly executed with the protruding stripes (10) on the stopper (8). When the stopper is shifted in the guidance chamber (40) and the stopper is turned 60°, the receiving means (11) serve as channels to take on the ribs/protruding stripes (10) on the stopper collar. After a 60° turn in case of three ribs equally divided on the stopper collar, the stopper is fixed by the bumper (12).

The stopper (8) in the guidance chamber (40) acts as a piston. Compared to the old system, the piston is carried out larger that the valve (stem/O-ring) in the old system of the prior art. This has the advantage that relative to the surface less friction resistance is carried out on the O-ring (5). This cannot buckle, the system is more robust, less critical.

Figure 8:
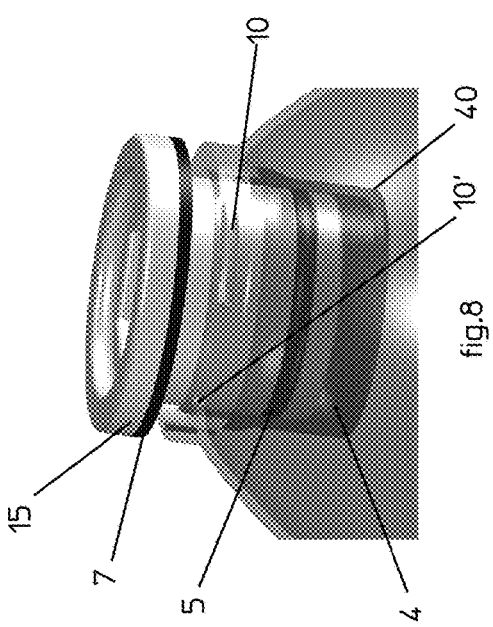

In FIG. 8 a guidance chamber (40) is depicted provided with the stopper (8). The hollow needle (26)/fluid connection (9) is free. Under the stopper a volume of compressed air is located. Air can flow freely from the pressure container (3) to the working pressure chamber.

Figure 9:
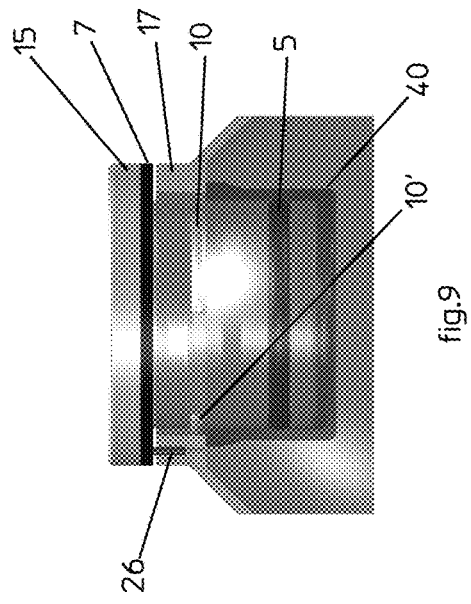

In FIG. 9 a guidance chamber (40) is provided wherein the stopper (8) is completely contained. This represent the closed position. As one can see, the closure ring (5), in this case an O-ring, contacts the needle and closes this off.

Figure 10:
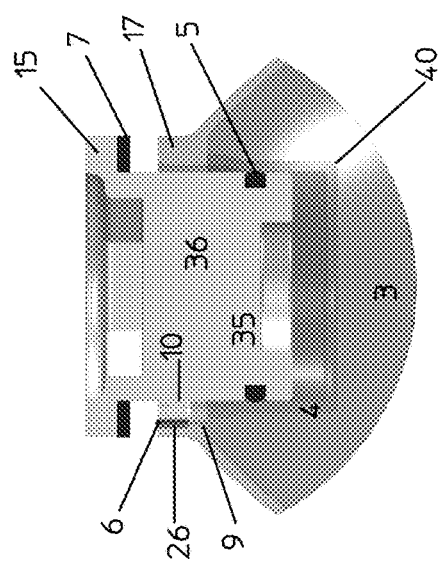

In FIG. 10 a cross section is provided of the situation depicted in FIG. 8. On this Figure one can see well how the hollow needle (26) slightly protrudes from de rim (17) of the chamber, how it is positioned in the fluid connection (9) that connects the pressure container (3) and the working pressure chamber.

Figure 11:
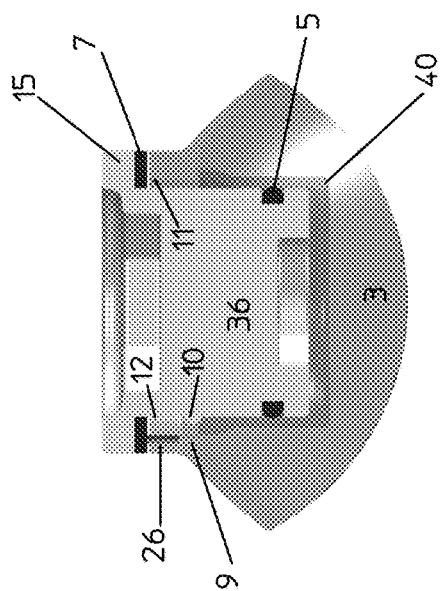

In FIG. 11 a cross section is provided of the situation depicted in FIG. 9. Here one can see how the hollow needle (26), in closed position of the chambers, is closed off. In addition one can see how the protrusion/bumper (12) on the inside of the rim (17), serves as a brake for the protrusion on the neck of the stopper (8).

The O-ring provides for closing of the stopper on the side. This provides for air remaining stored underneath the stopper (8) and being compressed there. The O-ring can be separately applied at assembly of the system or it can be sprayed on during the injection moulding production process. The ribs (44-46) on the side walls of the stopper collar provide for positioning and guidance of the stopper (8) in the guidance chamber (40).

Figure 12:
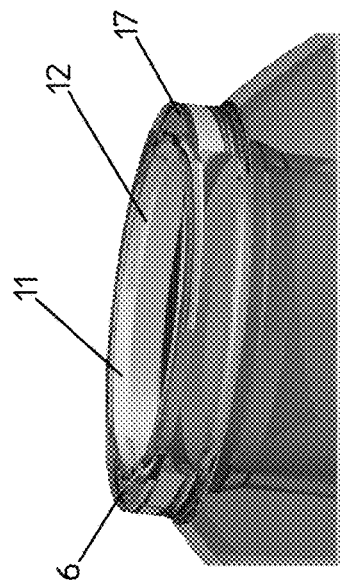
Figure 13:
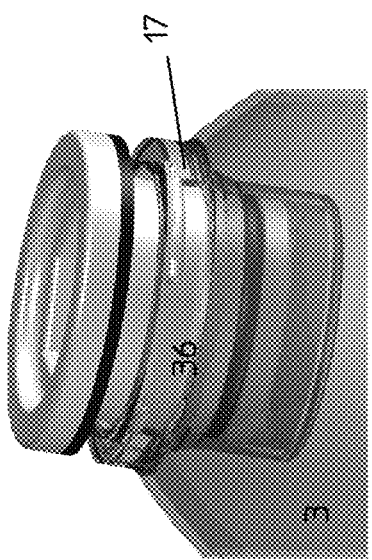
Figure 14:
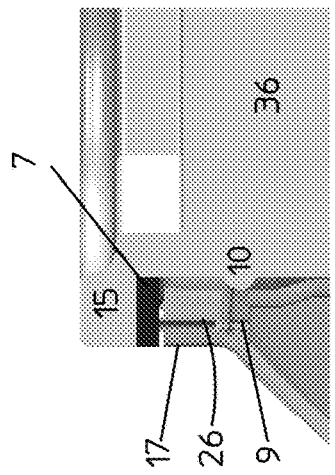
Figure 15:
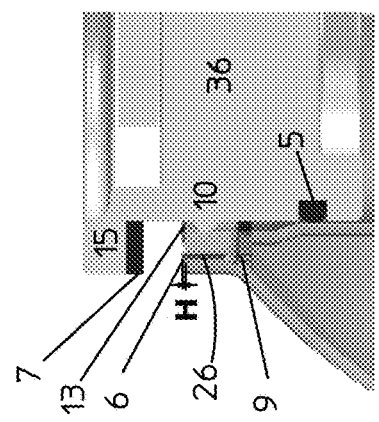

Preferably an edge or knife (13) are additionally provided on the rim of the guidance chamber in the direction of the stopper, as depicted in FIGS. 12-14; 2 and 4. A cross section and detail are provided in FIGS. 14 (open position) and 15 (closed position). It can also be seen that the needle protrudes as much as the pointy edge (13). In closed position the protruding edge (13) provides for a seal between the guidance chamber (40) and the working pressure chamber and additional protection after a potential pressure loss compared to the O-ring (and compared to the pressure control chamber; 4).

If the O-ring is damaged, the pressure control device is still open, unlike the prior art system. With damage to the O-ring, air leaks slowly under the stopper (8). An empty pressure control chamber (4) cannot provide a pushing effect any more.

With the mechanism of the invention, a small pressure difference on the outside of the pressure control chamber is still sufficient to lift the stopper. In the prior art system the valve no longer functions in case of a small damage or slightest defect/malfunction causing the dispenser to become unusable. With the new system the dispenser remains usable.

FIG. 12, provides a view on a magnified protruding ridge (13) on the guidance chamber. On can see the protruding hollow needle (26). In addition, one can see the grooves/ receiving means (11) on the inner side of the guidance chamber which are provided to take on the ribs/protruding stripes (10) on the stopper collar after the stopper is shifted in the guidance chamber and turned 60°. The guidance chamber (40) is sufficiently broad for the stopper (8) to move back and forth and to provide a suctioning function. By means of the 60 degree turn the stopper can no longer detach from the basin. With a smooth edge, potentially without interruptions) this can also be obtained and potentially function as a click system.

The functioning of the pressure control device (1) according to an embodiment of the invention is further illustrated by means of the schematic drawings provided in FIGS. 1 to 4.

Through the opening in the bottom (41) air is brought into the pressure container (3) to a pressure of around 7 bar. By means of the fluid communication fluid connection 9, provided with a hollow needle (26) protruding above the rim (6), air flows from the pressure control container (3) to the working pressure chamber (50) where an air pressure is build up. When the desired setting is obtained, and the pressure of the pressure container (3) is approached, then the air pushes on the stopper (8) provided in the guidance chamber (4). The stopper (8) moves towards the direction of the pressure container. When the closure member (7) touches the extending edge of the pressure container (3), the needle (6) and the fluid connections (9) are closed off. The opening in the bottom closure is closed with a rubber stopper (1).

Upon actuation of the spray bottle, fluid escapes from the container storage. Under pressure of the air the movable cap, moves towards the dispenser opening. The pressure in the working pressure chamber decreases by means of the increasing volume. The decreased pressure on the stopper and the compressed air in the pressure control chamber (4) underneath the stopper (8), provide uplift for the stopper towards the dispenser opening. The fluid connection (9) opens, air flows from the working pressure chamber, and pressure is build up. The stopper (8) moves towards the bottom closure (42) and the working pressure chamber (3) is closed off again.

The functioning of the pressure control device (1) explained above is further illustrated by means of the measurement results provided in FIGS. 16 and 17. A working pressure is build up to a desired level, in the graph corresponding to about 1.85 bar. The desired value is obtained by the downward movement. Once the desired level is obtained, the connection between the outer- and inner side of the pressure container and the working pressure chamber closes.

When one releases pressure or product, the fluid communication channel opens and the pressure decreases (first downward peak on the graph). When pressure is added, the predetermined pressure is obtained (second time 1.85 bar) and maintained. This cycle is repeated a number of times. On the graph once can see that every time pressure drops, a fast build-up of pressure follows. Every time the predetermined value is obtained again. In addition a fast build-up of pressure is obtained (shoulder to the rising peak). This experiment shows the functioning and repeatability of the pressure building mechanism. The mechanism does not break down after (repeated) pressure loss.

The graph in FIG. 17 shows a similar test. The narrow peaks demonstrate that the cycle of closing is almost immediately. Pressure is build up to a set pressure. There is an immediate closure (peaks without shoulder). The difference with the experiment form the previous graph, is the material choice of the silicone ring. This cannot be too hard, it is preferably elastic. An elastic material surrounds the needle and closes of well. When a hard rubber ring is used, the system works less precise. There is still sufficient closure of the needle.

The opening of the needle is preferably 0.5 mm in diameter. The smaller the opening the easier it is to close and the more precise but also the more slowly the pressure build up.

Where the prior art prior art system is provided with a 2.2 bar pressure to be able to supply the desired 1.5 bar pressure for product such as raiser foam, a pressure of 1.5 bar is sufficient in the present system. There is no need for a margin. Where the prior art system is limited to at most 3 bar pressure, more pressure can be provided in the new system. This can provide access to new applications. The parts are preferably carried out in a plastic, more preferably PET (polyethylene terephthalate). An embodiment wherein the parts of the pressure control device are provided in transparent plastic has the advantage that the consumer can see the mechanism when using the pressure control system. The needle is alternatively in metal.

Figure 20:
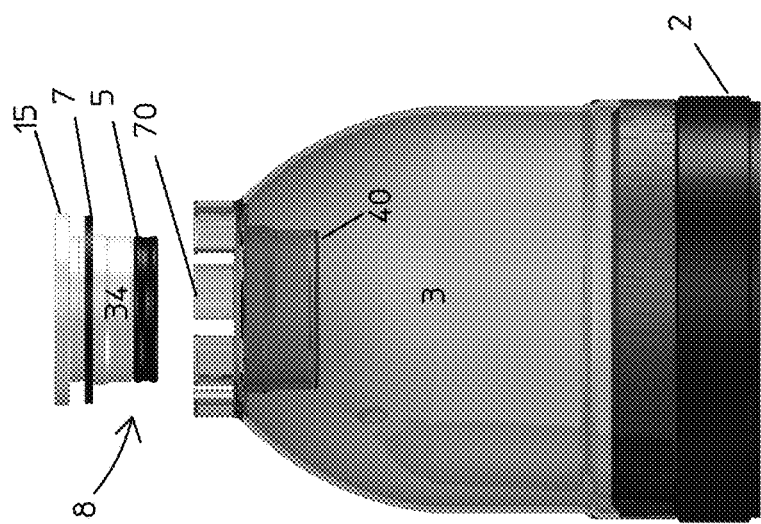
Figure 19:
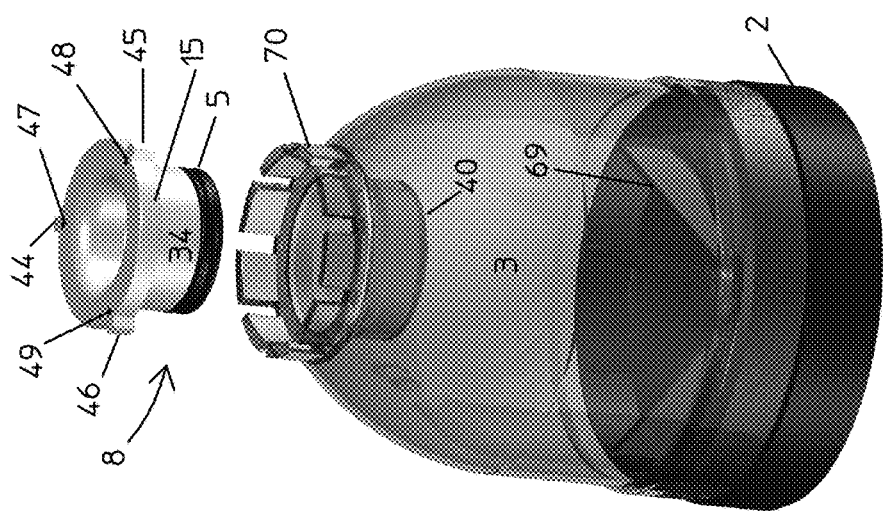
Figure 18:
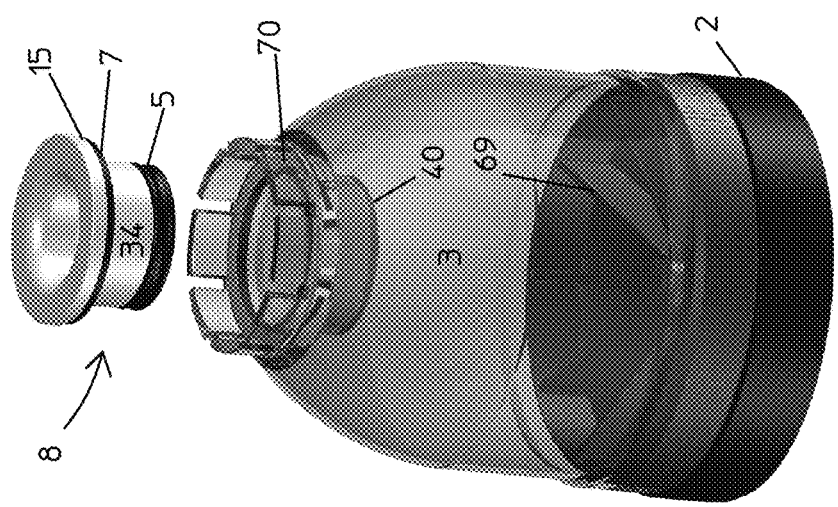

FIGS. 18-20 show further embodiments of a pressure control device according to the invention. FIG. 18 shows an alternative pressure control device with click-in mechanism made possible by use of a quad-ring. By the term "quad-ring" as used herein is meant a solid elastomeric ring seal with a four-lobed cross-section, also known as x-ring. The use of a quad-ring is advantageous as the four lips create more sealing capacity and at the same time a groove for lubrication, which is very favourable for dynamic sealing. The most important advantage is the high stability for dynamic applications. In the situation that an O-ring rolls in the groove and creates torsion, a quad-ring will slide with no negative results. More resistance to spiral failure is provided.

This embodiment compared to the embodiment depicted in FIG. 5, has no protrusions (10) on the neck of the stopper. The collar serves as guiding means. The collar now serves the purpose of closure, click-system and guidance.

Figure 23:
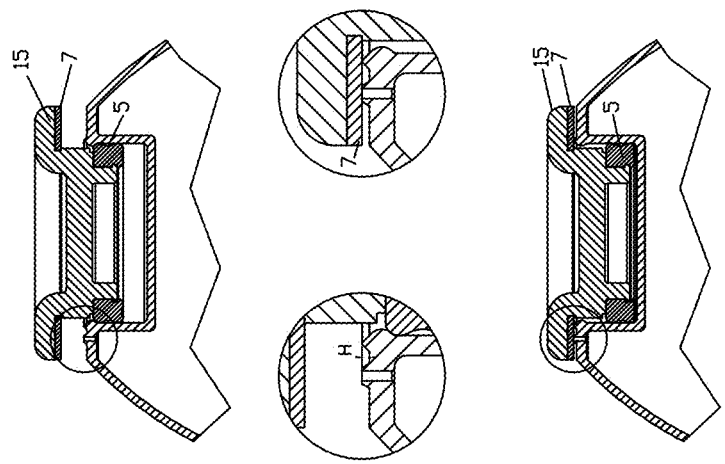

As can be seen in FIG. 18, the pressure reservoir (3) is made of transparent plastic in the form of a bell shape. The wall at the top of the bell has the shape of a cylindrical container (40). The cylindrical container has a closed bottom end and an open top end. The circumference of the top end is provided with a rim from which teeth-like protrusions extend (70). At the extremities the teeth-like shapes are slightly thicker. The bell shaped pressure reservoir has an open bottom end. This bottom is form fitting with a bottom plate (2). The bottom plate was fitted into the open bottom end of the bell shaped pressure reservoir (3). It was laser welded to the bottom plate. The pressure device is further comprising a stopper (8) with a collar provided with a flat closure means executed in an elastomeric material. The neck (34) of the stopper is provided with halve of an X-ring in elastomeric material (5). The flat side of the X-ring is positioned towards the neck of the stopper. The rim part of the container is provided with a fluid connection (9) connecting the inside of the pressure reservoir (3) with the outside. It is provided with a needle which is slightly protruding from the rim surface. In relation to the teeth-like protrusions (70), the fluid connection is provided inside the circle formed by the teeth-like protrusions (70). The teeth-like shapes provide flexibility for insertion of the stopper (8). When the stopper (8) is clicked into the cylindrical container the teeth-like shapes (70) slightly bend outwards and move back into their original position again. FIG. 23 provides sections through the pressure control device (1) in open (top figure; left) and closed position (bottom figure; right). The thicker extremities (58) hold the stopper in place.

FIG. 19 provides an embodiment wherein the stopper (8) is executed with a collar (15) having three protrusions (44, 45, 46) that are form fitting with the spacing between the teeth-shaped protrusions (70) on the open end of the cylindrical container (40). The collar of the stopper is not provided with an elastomeric sealing means applied on the circumference of the rim. Instead it is provided in three parts evenly distributed over the rim. They are provided as plugs (47, 48, 49) in the collar of the stopper. The plugs are made from an elastomeric material.

FIG. 20 provides an embodiment wherein the stopper (8) is provided with a movable closure ring (7). Upon positioning of the stopper (8) in the container (40), the closure ring (7) closes off the needle. Product can be filled in a container with this device, without the risk of product ending up in the pressure container (3). After filling with product, the pressure container can be filled with air. Pressure will build up and the needle (26)/fluid connection (9) will be freed. Pressure will build up in outside the pressure container (3). Once the pressure outside the container is larger than in the first chamber (4), the stopper will be pushed down in the cylinder (40) and the collar (15) of the stopper (8) will move against the closure ring (7). The closure ring is restored in the original position. It functions like a return mechanism.

Figure 22:
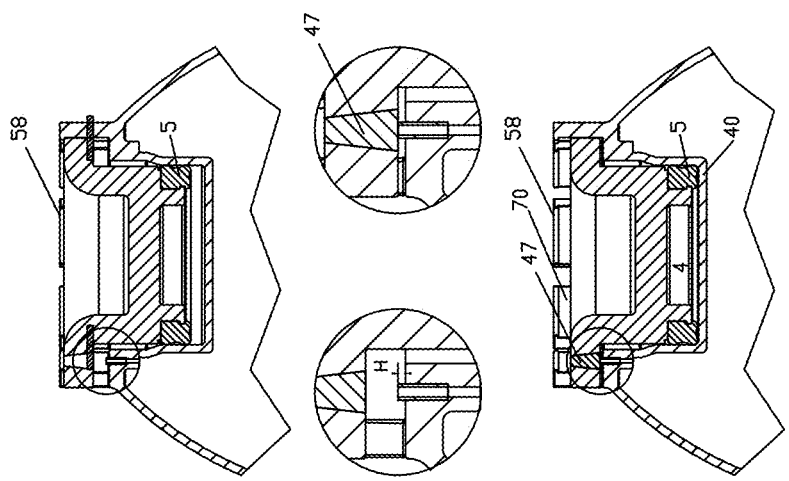
Figure 21:
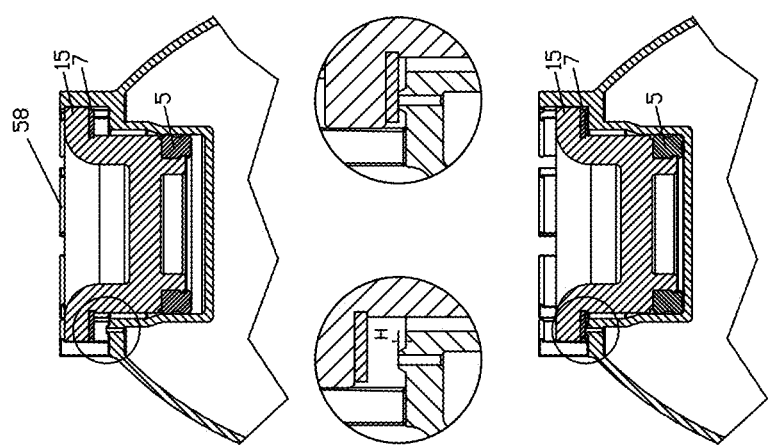

FIGS. 21 and 22 provide a cross-section of the embodiments provided in FIGS. 18 and 19. The collar of the stopper moves between a position I wherein it closes off the fluid connection and a position II where it is stopped against the thickened rim (58) of the teeth-like protrusions (70).

FIG. 23 provides a further embodiment of a compact pressure control device (1). The stopper (8) has a short neck and is provided with a flat surface elastomer material (7) on the rim part to act on the fluid connection (9). On the bottom part of the neck (35), the stopper (8) is provided with a closure ring, in this case an X-ring (5). At the open end of the cylindrical container (40), a thickening is provided on the inside (58). This prevents the stopper from moving passed this obstruction. This embodiment is further provided with a so-called knife (13), a sharp edged protrusion, between the stopper neck (34) and the fluid connection (9). It has an equal height H as the protrusion (6) surrounding the fluid connection (9). It provides protection.

Figure 27:
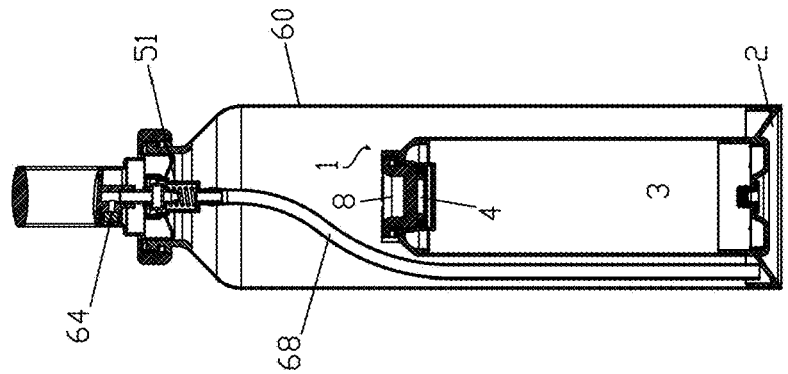
Figure 26:
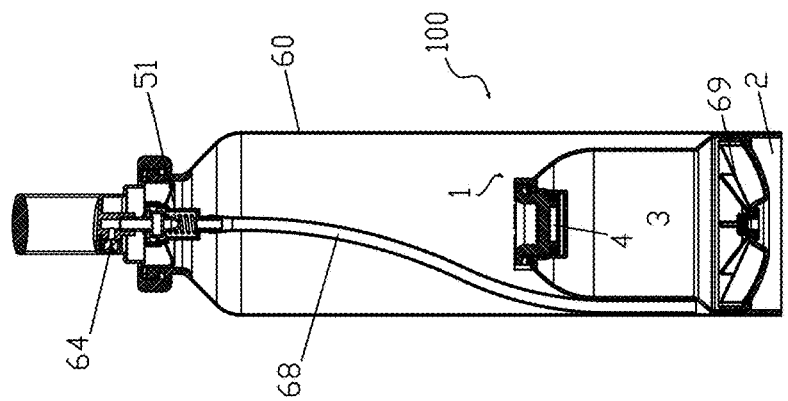
Figure 25:
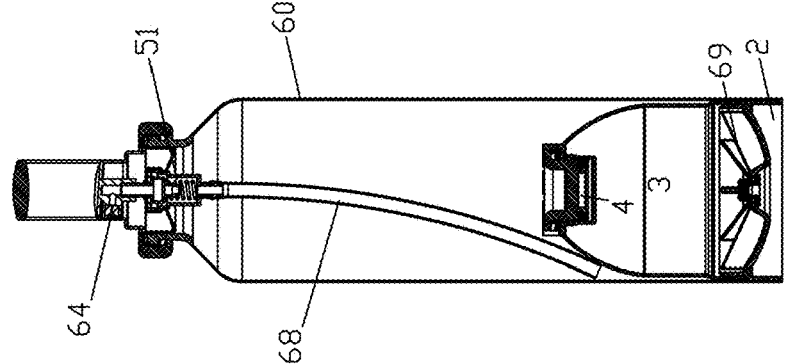
Figure 24:
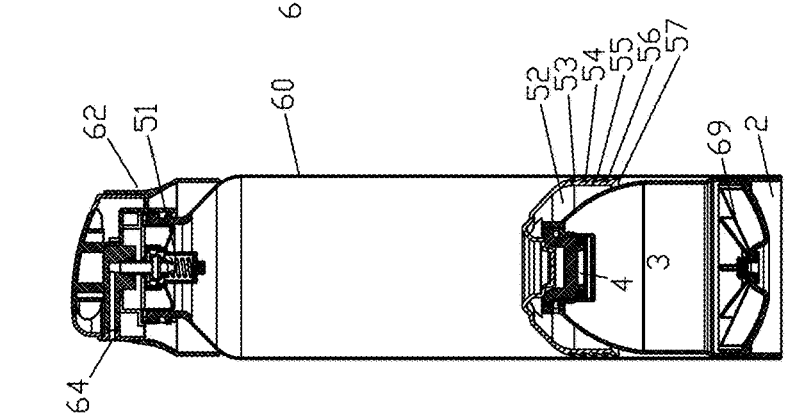

FIGS. 24-27 provide pressurized fluid containers (60) comprising a pressure control device (1) according to an embodiment of the invention and a fluid dispensing valve (51). The pressure control system (100) is further provided with either a dip-tube (68) or movable piston (52) with ribs (53-57). The bottom openings (41) are provided with Nicholson plugs (42). The bottom plates in FIGS. 24-26 are curved and provided with dividers (69). This is especially advantageous for being resistant to deformations when holding pressurized air. As can be seen in FIGS. 26 and 27, the dip-tube can be provided to reach all the way to the bottom plate (2). The dimensions of the pressure reservoir can be adjusted such that it can be surrounded by fluid. This gives the impression to the consumer that the container is fully used (FIG. 27). From FIG. 24 it can be seen that the stopper can be provided so that it fits with the indentation (65) in the movable piston (52). This has for effect that a compact stack can be provided. It provides for optimal use of space for holding product. The pressure control systems of FIG. 24-27 are further provided with a dispensing valve (50) and spray head with dispensing opening (64).

FIGS. 28-30 provide individual parts of a pressure control device (1) before assembly. FIG. 28 depicts a bell shaped pressure reservoir (3) with a form fitting bottom plate (2) with a central bottom opening (41) and radiating from the central opening are dividers (69). The upper side of the bell shape is provided with tooth-shaped protrusions (70). These protrusions are circumferential to the opening of a cylindrical container (40). On the inward rim part is an opening (9) connecting the inner part of the pressure reservoir (3) with the outside. Also provided is a stopper (8) provided at the bottom with an X-ring (5). The stopper (8) has a collar (15) from which three protrusions (44-46) are extending radially outward. These serve for positioning of the stopper (8). In the stopper rim are provided three elastomer plugs (47, 48, 49). The stopper (8) should be positioned so that at least one of the plugs (47) can act on the opening in the rim of the pressure reservoir (3).

FIG. 29 provides parts for the assembly of a pressure control device (1), comprising a stopper intermediate part, cylinder with two open ends and a bottom plate. The inner part of the bottom plate is form fitting with the opening of the cylinder. The outer part of the bottom plate is form fitting with the opening of the fluid container (not depicted). The cylinder was obtained from stretch blow moulding. After the process the part is cut twice to adjust the length to the required size. The orientation of the stretched material during the blowing process leads to a higher crystalline structure which gives high strength and good gas barrier properties.

FIG. 30 provides a compact pressure control device, comprising a stopper with short neck, a bell shape pressure reservoir (3) that encompasses a cylindrical container (40). On the rim of the bell shape and container are provided three fluid openings (6, 6', 6") surrounded by three protrusions. A bottom plate (2) is provided comprising a plug (42) that closes of a central bottom opening (41). Radially extending from the central opening are plate dividers (69). The bottom plate (2) is form fitting with the opening of the pressure reservoir (3).

Figure 31:
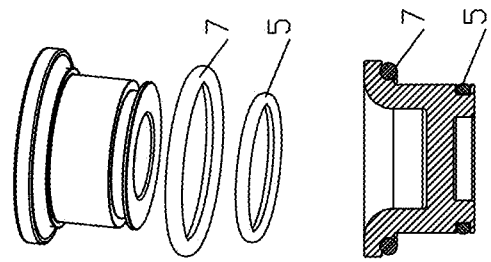

FIGS. 31-34 provide several stopper (8) arrangements that can be advantageously used in pressure control devices according to the invention. The stopper in FIG. 31 is provided with two O-rings. (7, 5). The collar of the stopper is provided with a first O-ring (7) to act on the fluid connection (9). The bottom part of the stopper is provided with a recess to take up the second O-ring (5) for sealing of the first chamber (4).

Figure 32:
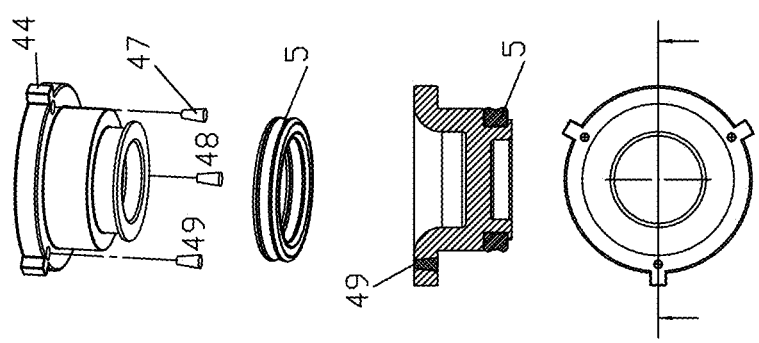

The stopper in FIG. 32 has a short neck. It is provided in the bottom part with half of an X-ring, the flat surface side facing the stopper neck. The rim part of the stopper is provided with a flat surfaced elastomeric material.

Figure 33:
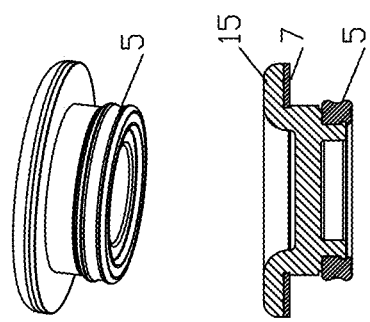

The stopper (8) in FIG. 33 is provided in the bottom part with half of an X-ring (5). The rim part of the stopper is provided with three plugs of an elastomeric material, located evenly spread over the circumference of the rim part. From the rim part are radially protruding three extensions which serve for the positioning of the stopper so the plugs may act on at least one fluid communication channel between the pressure container (3) and outside.

Figure 34:
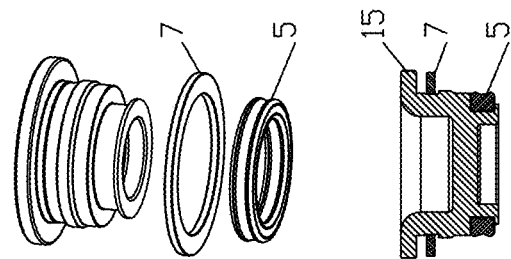

The stopper in FIG. 34 is provided with a protrusion on the neck part of the stopper. On this protrusion a flat surfaced ring of elastomeric ring is resting. This ring will shift to the bottom side of the stopper rim upon insertion of the stopper into the pressure container and closing of that container.

Figure 35:
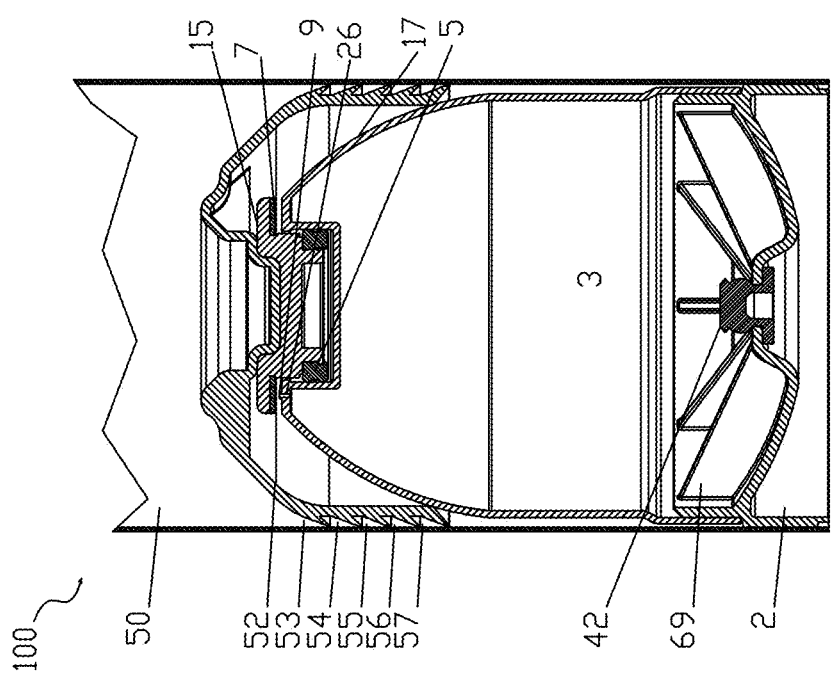

FIG. 35 provides a schematic representation of a pressure control system (100), comprising a fluid container (50) for holding pressurized fluid, a movable piston (52) with ribs (53, 54, 55, 56, 57), the central part of the piston (52) lying on the central opening of a stopper (8) with short neck. The piston is configured such that it rests on the shoulder of the pressure cylinder (3) and does not prematurely close-off the fluid connection (9). The stopper neck is provided with an X-ring (5) enclosed in a cylindrical container (40) thereby providing a first chamber (4). The cylindrical container is part of the wall of a pressure cylinder (3) holding pressurized air. In the wall, in the upper part facing towards the fluid container and piston, is a fluid opening provided with a needle that is slightly protruding from the pressure cylinder wall. The protrusion and opening are covered by a layer of elastomer material as closing member (7) provided on the rim part of the stopper (8) facing the opening (9). In closed position, the elastomer material (7) acts on the opening (8) and closes it. The bottom plate (2) of the pressure container is curved. It is form fitting with the opening of the pressure container (3). Where material is overlapping, the bottom plate is welded to the pressure container (3). The central opening (41) of the bottom plate (2) is closed off with a Nicholson plug (42). The bottom plate is provided with dividers (69).

Figure 36:
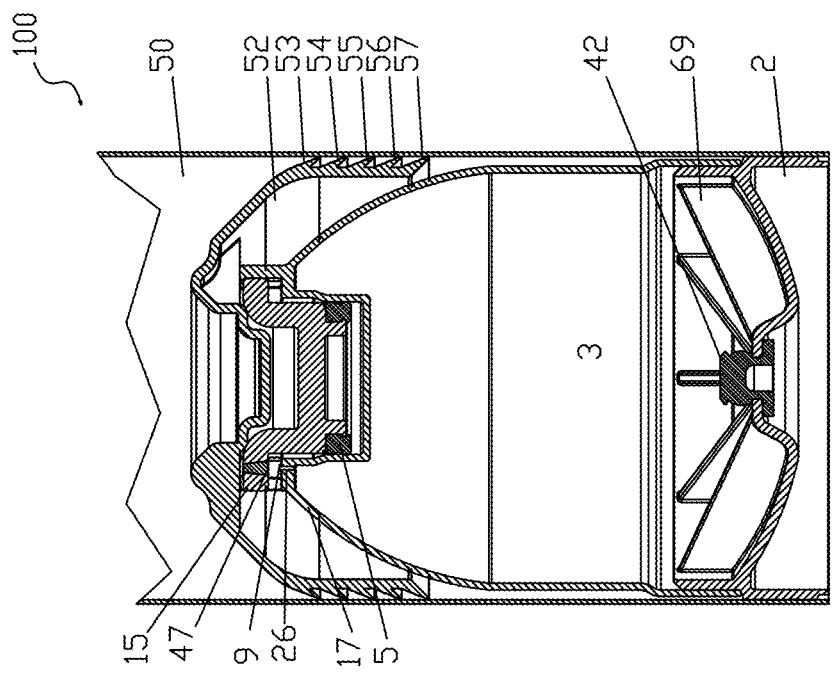

FIG. 36 provides a schematic representation of a pressure control system (100), comprising a pressure control device (1) that is open. The stopper provided here has a longer neck (8). In its rim part it is provided with a plug (47) that can act on the protrusion (6) and opening (9) between the pressure container (3) and outside facing the movable piston (52). The piston is configured such that it rests on the thickened rim (58) of the teeth-like protrusions (70). In this way, it cannot push the stopper inside thereby prematurely closing off the fluid connection (9).

FIG. 37 provides an embodiment with three protrusions displaying a frustoconical shape provided on a flat edge (97) of the second container (40) (on the left) and different options for protrusions (on the right): knob, needle (16). It is not required that all protrusions provide a fluid connection (9) between the second container (3) and the fluid container (50). One fluid connection (9) is sufficient. The embodiment on the left also shows a knife that is of equal height as the protrusions (6, 6', 6"). In the embodiment on the right the protrusions (6, 6', 6") are provided within a wall of fingers (81) and openings (82). This feature provides snap-fit connectability for a stopper (8; not displayed).

Figure 38:
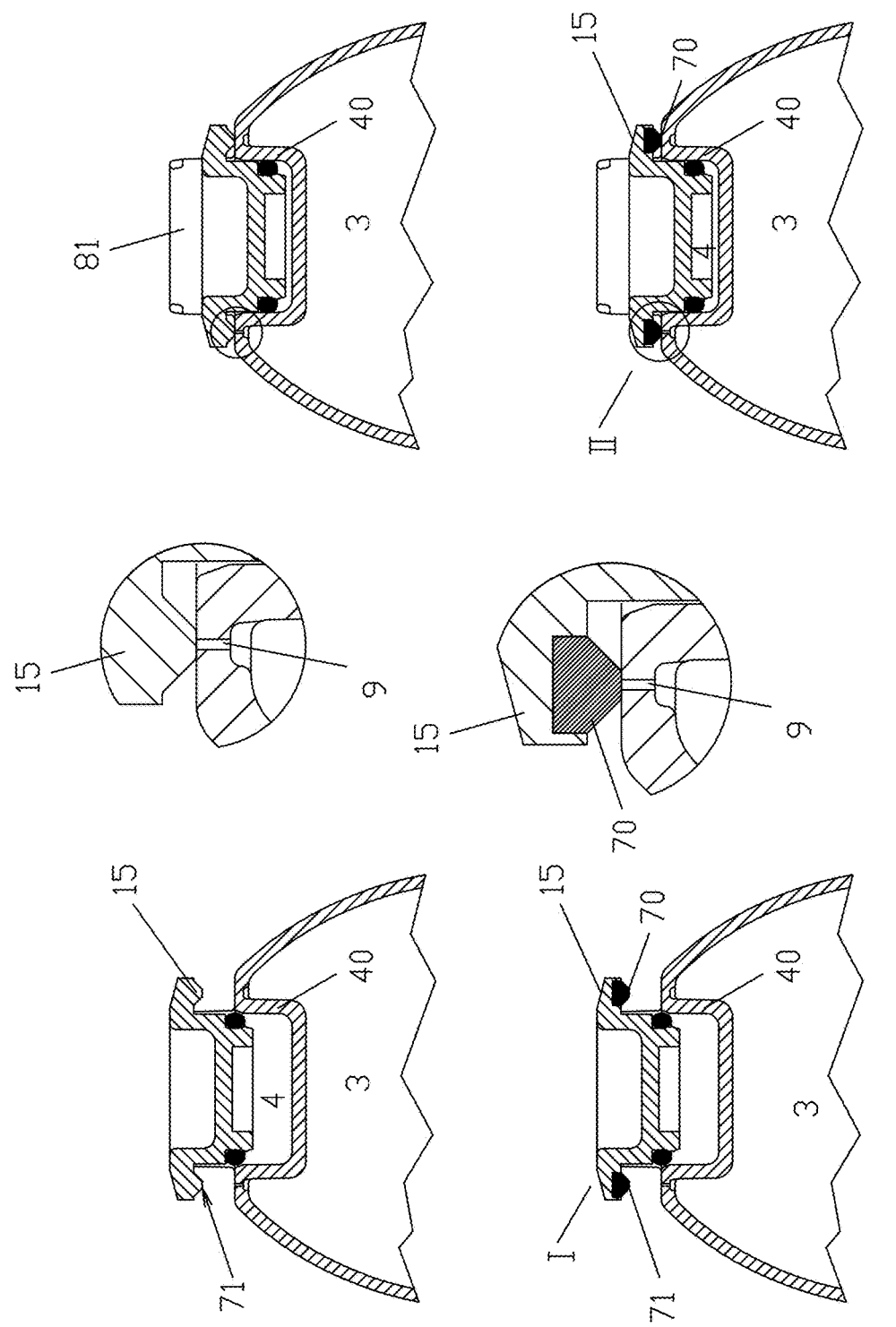

FIG. 38 provides an embodiment wherein the protrusions (71) are provided on the stopper (8). The fluid connection is provided opposite the protrusions (9). The drawings provide cross-sections through the stopper (8), first chamber 4) and second chamber (3). The drawings on the left display a pressure control device in open position. On the right it is displayed in closed position. The protrusion (70) can be part of the collar shape of the stopper (8) as displayed in the top drawings, or they can be a separate part provided in the stopper (8) as displayed in the bottom drawings.

FIG. 39 provides an embodiment of a pressure control device with a separate insert (230) comprising the cylinder (40) and the fluid connection (9). The fluid connection is provided with a circumferential protrusion (6). The insert is combined with the second chamber, as displayed on the left. The second chamber now encompasses the first chamber. For this vessel to be pressurizable, the insert needs to be connected to the second chamber. This can be achieved by welding, preferably by laser welding. For the enhancement of laser welding, the insert can at least be partly provided with carbon black. The stopper (8) is provided with a collar (15). The second chamber has a dome shape with on the top of the dome, a third cylinder (81). This serves as a guidance for the stopper (8). The thickened edge (79) on the border of the third cylinder (81) serves to keep the stopper in place.

FIG. 40 provides an embodiment displaying the different steps of assembly of a pressure control device. The pressurizable vessel (3) is combined with a bottom plate (2) with strengthening fins (69). Combination with the vessel provides additional support during pressurization. The bottom plate is provided with an opening (41) for receipt of a plug (42). The stopper (8) can be combined with the pressurizable vessel (3) before or after combination with the bottom plate (2). Preferably the bottom plate is constructed in a way that it provides a snap-fit connection with the pressurizable vessel (3). This provides for a temporary connection. Once the construction is complete, and at the latest prior to pressurization, the pressurizable vessel is permanently connected to the bottom plate (2), for instance by laser welding. Preferably the stopper is inserted in such a manner that the second chamber (4) is still under atmospheric pressure. This has for effect that it is less sensitive to damage during transport. This can be advantageous when the assembly of the parts does not take place in one factory, but is spread over different sites. In a next step, the pressure control device is provided with a piston (52). The piston is in a shape (215) that fits with the stopper and has a feature (220) to prevent premature closure of the stopper (8). In the figure the piston (52) only slightly depresses the stopper. Next, a container (50) is inserted on top of the pressure control device (not displayed). The container is filled with liquid from the top. The pressurizable vessel is filled with propellant, preferably air, from the bottom, through a Nicholson valve. Closure of the valve completes the assembly of the pressure control system FIG. 41 provides an embodiment wherein the collar (8) of the stopper is in the form of two parts (15). Both will be provided with a sealing tape (7). The neck of the collar (8) has a groove for for taking up a sealing ring. Preferably a stopper is provided with a small undercut (80) or in absence of an undercut (80'). The inventors found out that an undercut is required to prevent the sealing ring to stay behind whilst the stopper is moving upward when the pressure control device is in use. However, with an undercut or groove, the stopper (8) can not be made with injection moulding using a single mould. It requires that a slide is used. The embodiment of a stopper depicted on the right (8') has no undercut. The inventors found that increase of the sealing rings cross diameter (5'), provides a sealing ring that follows the movements of the stopper (8').

Figure 42:
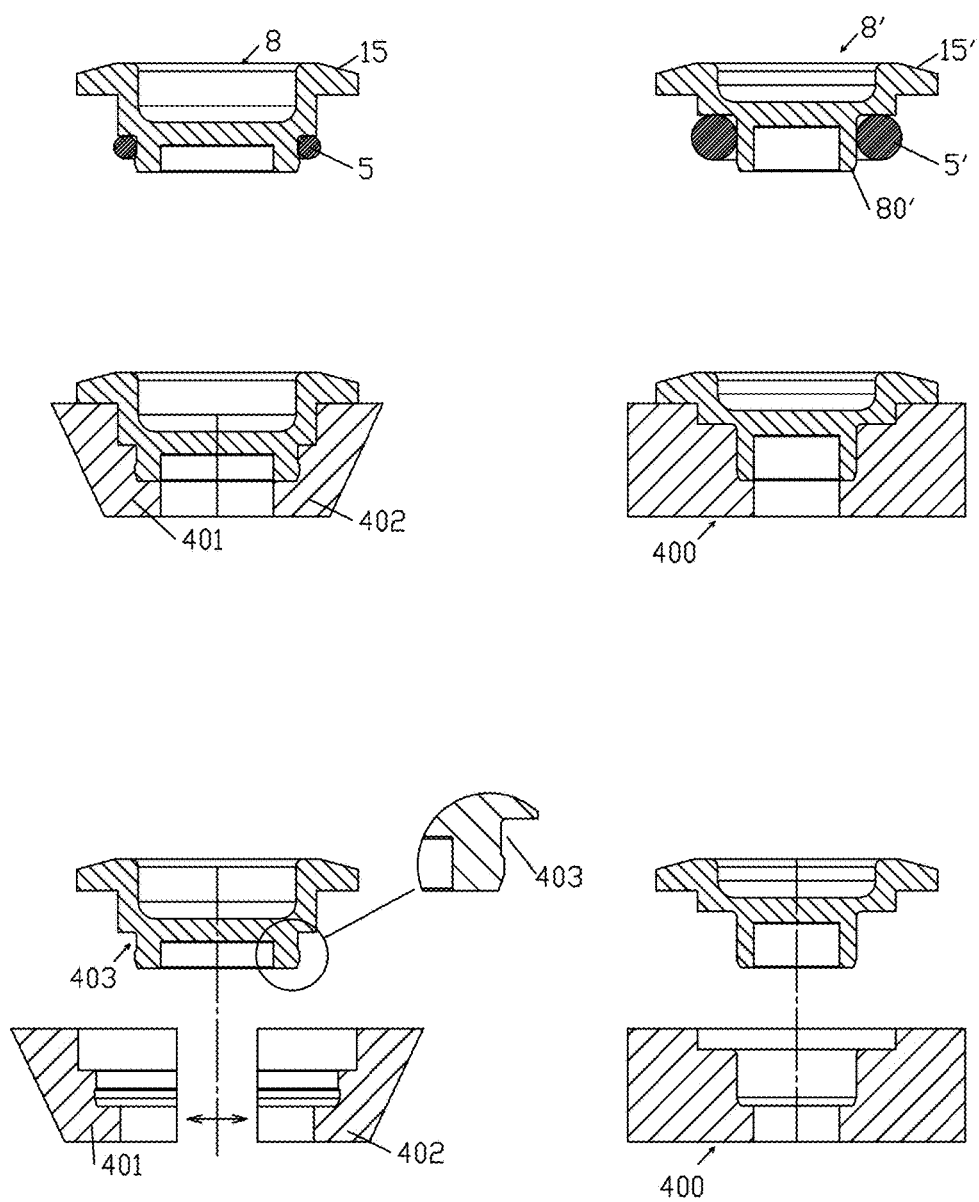

FIG. 42 displays the principle of injection moulding using a slide (401, 402) to obtain a stopper (8) with a groove (403). For a stopper without an undercut (8'), a mould without slide can be used. This is depicted on the right.

Figure 43:
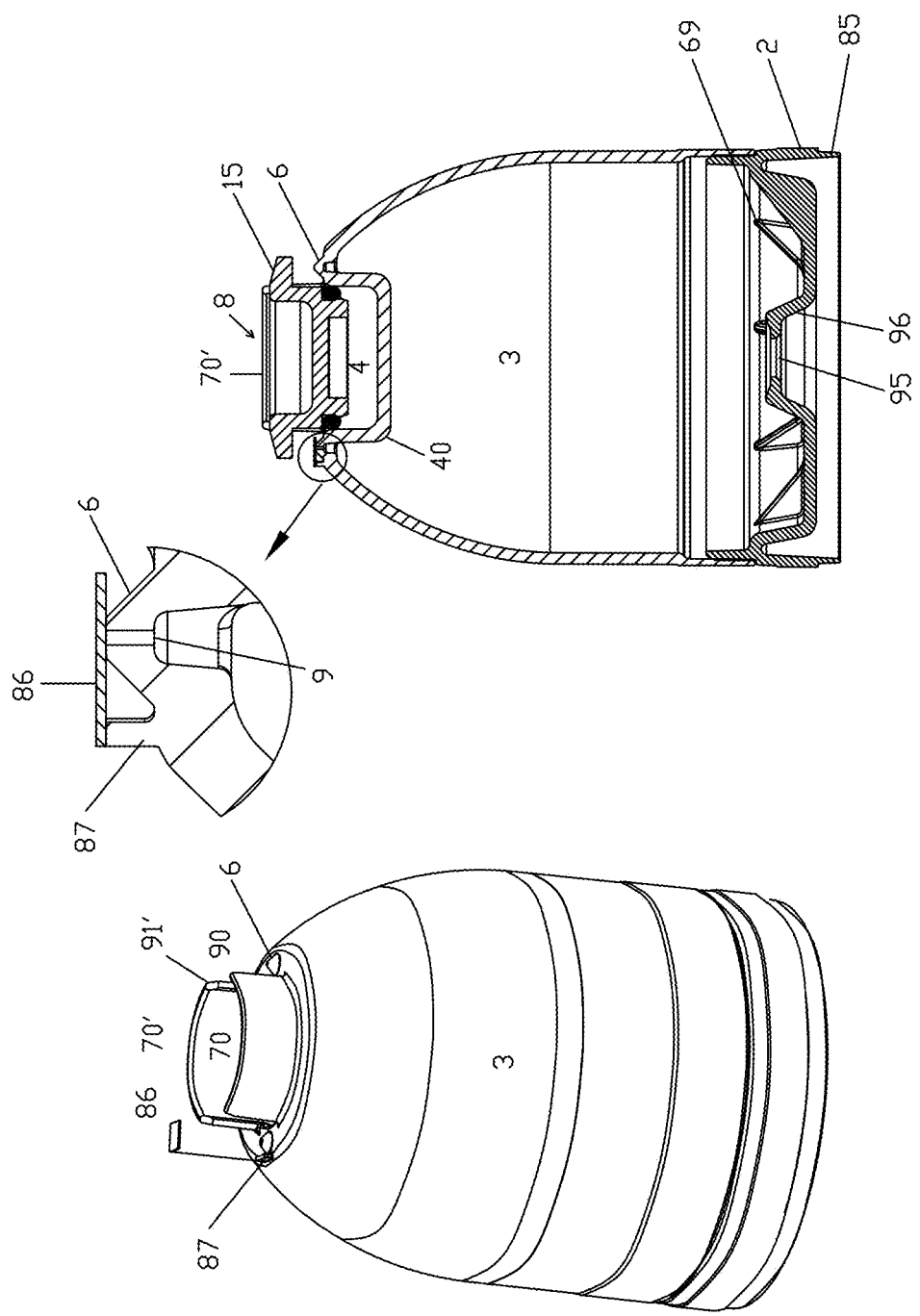

FIG. 43 provides an embodiment wherein the pressurizable vessel (3) has a dome shape with a flat ring on top and with an additional cylindrical volume provided by two walls (70, 70'). The walls provide guiding means for a stopper with a two-part ear-shaped collar as displayed in FIG. 41. The fluid connection (9) was obtained by drilling using two different diameters for the drill. The protrusion (6) that encompass the fluid connection is covered with a liquid barrier (86). This liquid barrier (86) is on one side attached to a support (87). On the opposite side is is not attached. On filling of the fluid container with product, the fluid connection is protected. Fluid can not enter the pressurizable vessel (3). The stopper can remain in a position that leaves the first chamber (4) open, i.e. under atmospheric pressure The second chamber (3) was obtained by injection moulding using a central injection point. The sprue mark is still visible. It can be removed in production. The injection point can also be selected closer to the floor of the second chamber (4).

Figure 44:
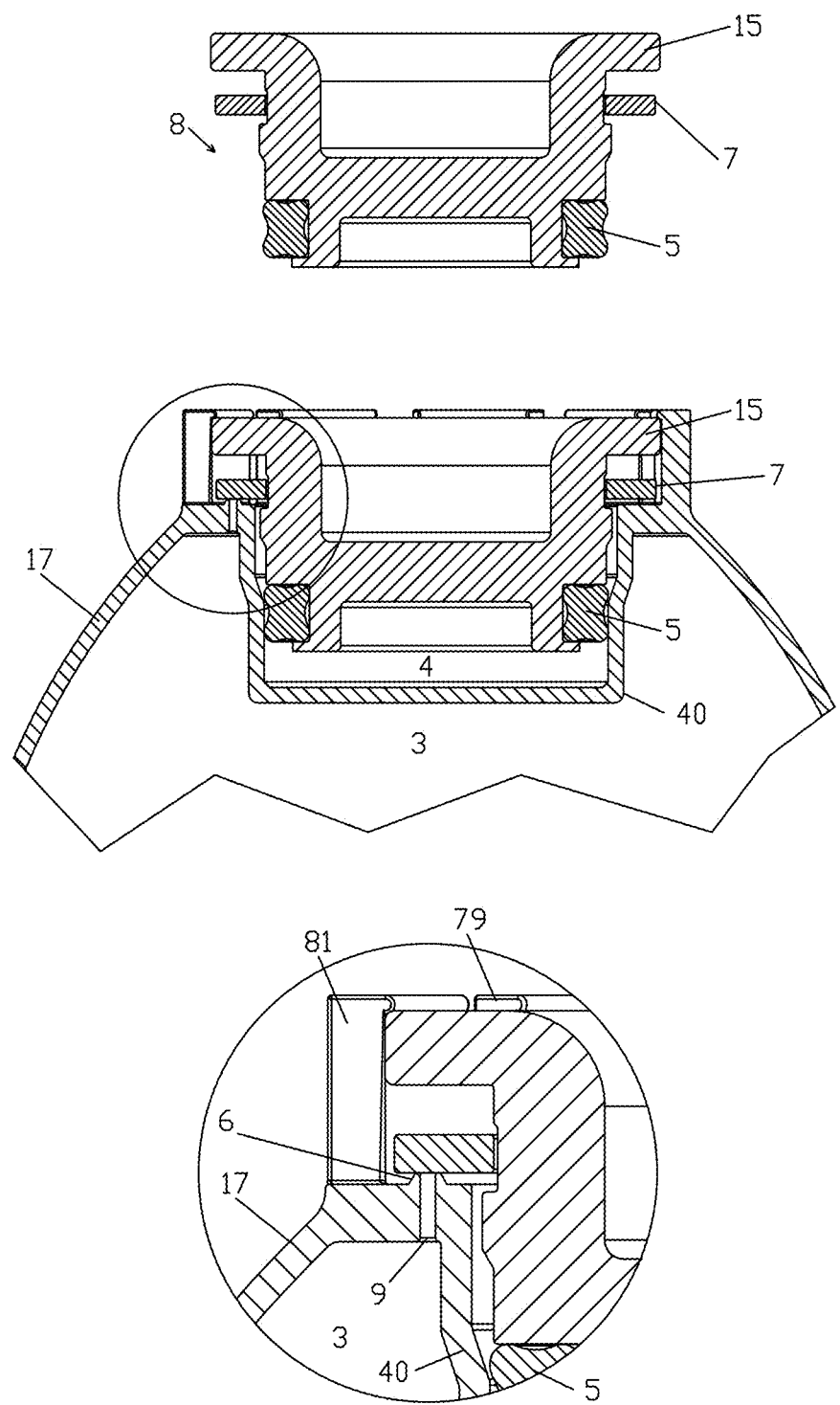

FIG. 44 provides an embodiment with an alternative liquid barrier (7). In this example, the closure ring is detached from the rim part (15) of the stopper (8). Upon assembly it will protect the fluid connection (9) from filling with fluid. As the pressure control device is activated, the stopper will move downward and the rim part (15) will press against the closure ring (7). In use the rim part (15) and closure ring (7) will move together. The bottom part of the stopper's neck is provided with an X-ring (5). This closure seals the first chamber from the environment.

FIG. 45 provides an embodiment wherein a second chamber (3) encompasses the cylinder (40) and is provided for receipt of the stopper (8). The fluid connection (9) is provided outside of the cylinder (40). The cylinder (40) is provided with vents (72). These serve to keep the cylinder (40) under atmospheric pressure when the stopper (8) is only slightly inserted into the cylinder (40) to form the first chamber (4). The second chamber (3) has a second cylinder (81) on top of its dome. This cylinder provides guidance to the stopper (8). Its thickened edge (79) prevent the stopper from leaving the first chamber (4) when in use. The second chamber (3) is provided with a bottom plate (2) with strengthening fins (69). In the plate there is a frustoconical shape (96) with an opening (41). The opening can be sealed with a plug, preferably a Nicholson plug (not shown).

FIG. 46 provides an embodiment with a pressurizable cylinder (3) provided with two concentric cylinders (500, 70, 70'). The outer cylinder is uninterrupted. The inner cylinder has two openings that serve as guiding means for a stoppers rim parts. Also provided is a moveable piston (52) with annular sealing ribs (53-57). On the inside the piston (52) is provided with fortification ribs (502), a piston support (501) and a centrally located piston protrusion (215). The piston protrusion (215) is provided to fit with the stopper (8). The piston support (501) is shaped to fit over the stopper (8) and rest on the second chamber (3). This way, the stopper will not be depressed too far down. This embodiment is advantageous for transport. The pressure control device (1) is protected by the piston (52). They can be shipped together to the location where the fluid containers (50) are manufactured. There they can be inserted into the container for production of aerosol dispensers. Alternatively, the piston is removed from the second chamber (3), inserted into the fluid container (50) and the container with piston (52) are placed over the pressure control device (1).

FIG. 47 depicts several steps in the assembly process of an dispenser. It visualizes the process of activation of the pressure control device by pushing the piston down during filling. On the left is a pressure control system obtained from a fluid container (50) with piston (52) in the top being placed over a pressure control device (1). The pressure control device comprises a second chamber (3) encompassing a cylinder (40) that can house a stopper (8) with sealing ring, to provide a first chamber (4). The second chamber is provided with at least one fluid connection (9) between the second chamber (3) and fluid container (50). It can be closed off and opened by movement of the stopper (8) inside the cylinder (40). The pressure control means (7) are provided opposite the fluid connection (9). Upon insertion of fluid into the container (50), the piston (52) moves downward towards the second chamber (3). The fluid container is provided on its top with a dispenser head (84), e.g. by crimping a valve mounting cup with valve arrangement onto the neck (83) fluid container. The second chamber (3) is filled with air and compressed to a predetermined pressure. The second chamber is sealed with a plug, preferably a Nicholson plug.

Figure 48:
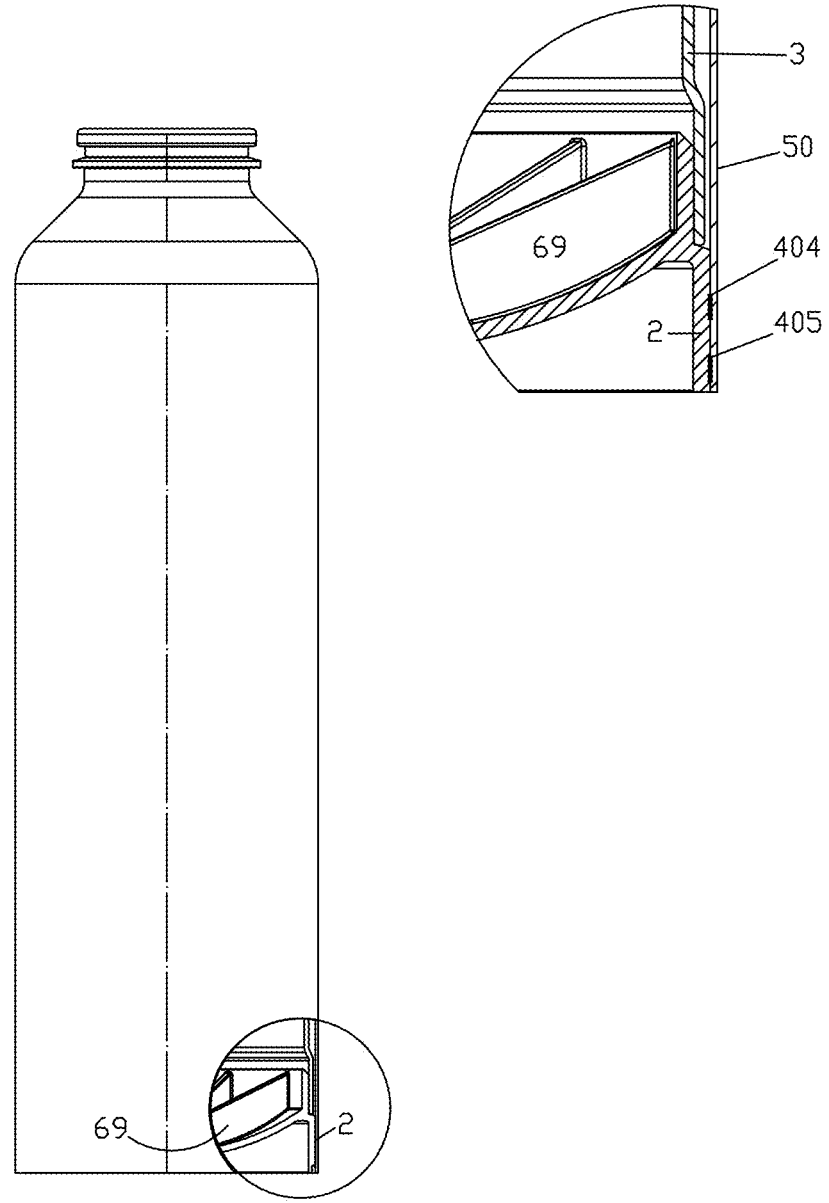

FIG. 48 depicts a fluid container (50) provided with a pressure control device (1) comprising a pressurizable vessel (3) closed by a curved bottom plate (2) with strengthening fins (69). The pressurizable vessel is connected with the bottom plate (2) and the fluid container wall is connected to the bottom plate (2). At its bottom the fluid container (50) is provided with two seams (404, 405) obtained by welding. The preferred embodiment where the seams are provided closely together is displayed. It is advantageous to have a seam close to the edge of the fluid container. This has for effect that if parts chip off in a drop test, they stay attached to the container. This provides increased safety.

Figure 49:
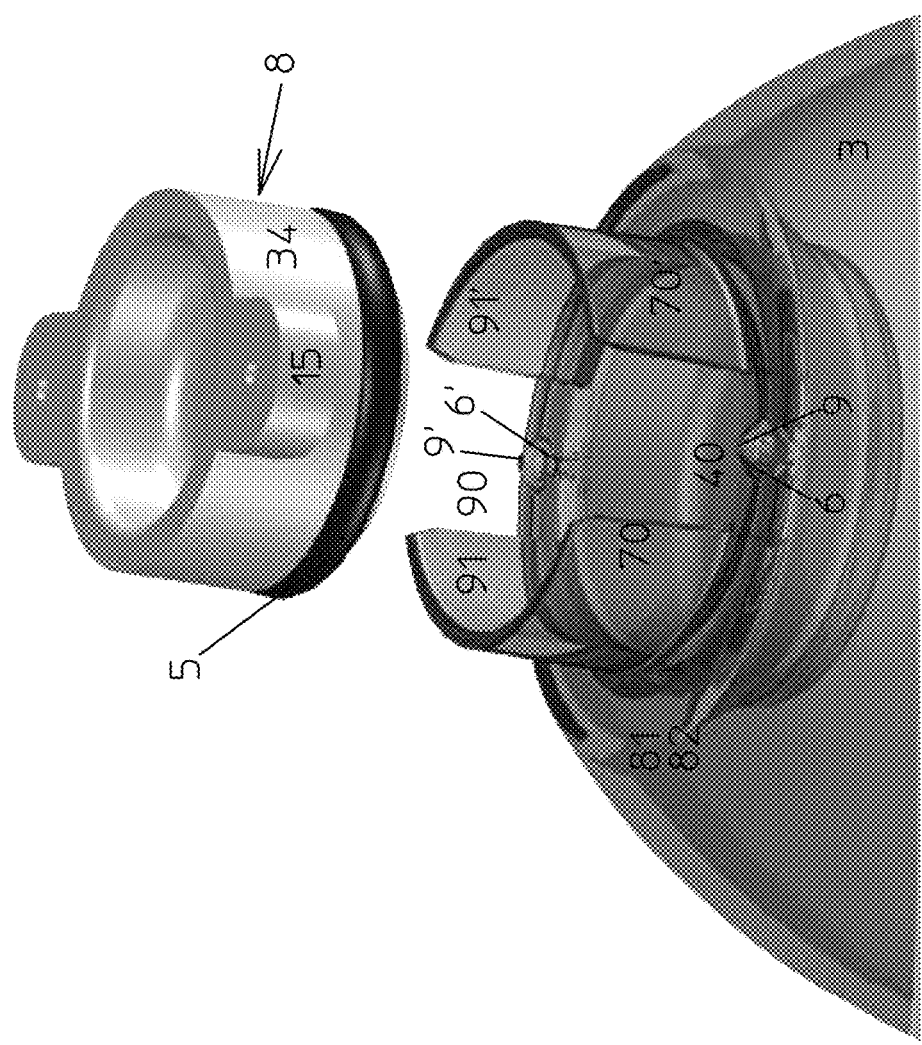

FIG. 49 depicts venting means that are provided as interruptions in the wall of the extended second cylinder. The extended cylinder wall (91, 91') is interrupted two times (90). This also provides guidance for the positioning of the stopper. It facilitates positioning of the closing member(s) opposite the fluid connection(s) (9, 9').

FIG. 50 is a schematic representation of a pressure test. It displays a laptop (300) connected to a measurement probe (301). The measurement probe (301) is connected to the fluid container (60) by means of a connector (302). The pressure control device is attached to the fluid container (60) by a bold (303). The fluid connection (9) is connected to a an external reservoir (305) with a connector (304). The external reservoir (305) has a volume corresponding to what would otherwise be the second chamber (3). Also displayed are a meter (306) and a crane (307). The dispenser has a regular dispenser head (64) from an air freshener (64) with a valve mounting cup (240) and a dispensing valve (62).

FIG. 51 graphically displays the result of a pressurization test at 15 bar. The external vessel (3, 305) was pressurized at 15.2 bar (reference A on graph). After 21 hours the pressure in the fluid container (60) was measured by means of the measurement probe (301). The work pressure was 2.115 bar (ref B). After a pressure release of 10 seconds, the work pressure was 1.9 bar (ref G). After 28 h is was 2.1 bar (ref C). After a pressure release of 10 seconds, the work pressure was 1.9 bar (ref H). After 40 hours the work pressure was 2.1 bar (ref D). After a pressure release of 10 seconds the work pressure dropped to 1.9 bar (ref I). After 55 h the work pressure was 2.1 bar (ref E). After completely emptying the fluid container and removing the water contained in it, during about 3 min 30 seconds, the work pressure was 1.9 bar (ref 3). After 64 hours the work pressure was 2.0 bar (ref F). This experiment demonstrates that the pressure regulation also works at high pressure, i.e. equal to or above 15 bar.

The invention claimed is:

1. A pressure control device for maintaining a constant predetermined pressure in a fluid container which is arranged for dispensing a fluid contained in the container from the fluid container at said pressure, the pressure control device comprising
    a cylinder having an open end and a closed end, and a stopper movable within said cylinder to define a first chamber,
    a second chamber encompassing the cylinder of the first chamber, the second chamber fillable with a gas which in use has a higher pressure than said pressure in the container,
    at least one fluid connection between the second chamber and the container, and a closing member movable relative to the cylinder for releasing and closing said fluid connection between the second chamber and the fluid dispensing container depending on the position of the closing member relative to the first chamber,
    the position of the closing member relative to the second chamber being at least dependent on the prevailing pressure in the fluid dispensing container and the prevailing pressure in the first chamber,
    while in use the fluid connection is released when the pressure in the fluid dispensing container decreases below the predetermined pressure, so that gas flows from the second chamber to the fluid dispensing container and the pressure in the fluid dispensing container increases until the fluid connection is closed by the closing member as a result of the increased pressure in the fluid dispensing container, characterized in that, said fluid connection is provided outside of said cylinder and facing said closing member.

2. The pressure control device according to claim 1, characterized in that, said fluid connection is provided with a circumferential protrusion extending from the outer side of the wall of the second chamber facing the fluid dispensing container; preferably extending by a height H1 of 0.1-2.0 mm.

3. The pressure control device according to claim 1, characterized in that, said closing member is provided with a protrusion for acting on said fluid connection; preferably said protrusion has a height H2 of 0.1-2.0 mm.

4. The pressure control device according to claim 2, wherein said protrusion is a knob, a frustoconical shape, a cubic or rectangular shape, such as provided by a needle.

5. The pressure control device according to claim 1, characterized in that, the cylinder and/or fluid connection are provided as an insert.

6. The pressure control device according to claim 1, wherein said stopper comprises a collar or one or more collar parts, preferably two collar parts, for actuating said fluid connection-ft preferably for actuating said circumferential protrusion.

7. The pressure control device according to claim 6, wherein the collar or one or more collar parts and/or the stopper neck, or the stopper, are provided with or are made from elastomer material.

8. The pressure control device according to claim 6, wherein one or more guiding means are provided for guiding of said one or more collar parts.

9. The pressure control device according to claim 1, wherein the stopper neck is made of a sealing material or is provided with a sealing material; preferably an O-ring or X-ring.

10. The pressure control device according to claim 1, wherein one or more liquid barriers and/or venting means and/or guiding means for guiding one or more pressure control means are provided.

11. A pressure control system comprising a fluid dispensing container and a pressure control device according to claim 1; preferably said container is a PET container or a metal can.

12. The pressure control system according to claim 11, wherein the fluid dispensing container has a dispensing opening with a dispensing valve, and a movable piston is provided in the container between the pressure control device and the dispensing opening, which movable piston is separating the fluid and the gas, and which is movable towards the dispensing opening by the excess pressure prevailing in the fluid dispensing container; preferably the movable piston is designed as a dome with annular ribs.

13. The pressure control system according to claim 11, wherein the container has a dispensing opening with a dispensing valve, and a bag for holding fluid is provided onto said valve.

14. The pressure control system according to claim 11, wherein said PET fluid dispensing container is attached to said pressure control device by welding, preferably by laser welding, more preferably by a double seam, most preferably one of said seams runs circumferentially around the bottom opening of said PET container.

15. A method for maintaining a constant predetermined pressure in a fluid container arranged for dispensing a fluid contained in the container from the fluid container at said pressure, the method comprising:
    providing a pressure control device according to claim 1 for delivery of said constant predetermined pressure;
    releasing the fluid connection of the pressure control device when the pressure in the fluid dispensing container decreases below the predetermined pressure; and closing the fluid connection when the pressure in the fluid dispensing container reaches the predetermined pressure.

16. A method for manufacturing a pressure control system comprising a fluid dispensing container and a pressure control device according to claim 1; preferably said container is a PET container or a metal can, wherein a pressure control device according to claim 1 is positioned inside a fluid dispensing container; preferably formed from a synthetic material by injection stretch blow-moulding or formed from a metal sheet; said fluid dispensing container is provided with fluid for dispensing; and said second container is filled with propellant, preferably compressed air.

17. Method for manufacturing a pressure control system according to claim 16, wherein said pressure control device is provided with a liquid barrier.

18. Method for manufacturing a pressure control system, comprising a fluid dispensing container and a pressure control device for maintaining a constant predetermined pressure in a fluid container which is arranged for dispensing a fluid contained in the container from the fluid container at said pressure, the pressure control device comprising a cylinder having an open end and a closed end, and a stopper movable within said cylinder to define a first chamber, a second chamber encompassing the cylinder of the first chamber, the second chamber fillable with a gas which in use has a higher pressure than said pressure in the container, at least one fluid connection between the second chamber and the container, and a closing member movable relative to the cylinder for releasing and closing said fluid connection between the second chamber and the fluid dispensing container depending on the position of the closing member relative to the first chamber, the position of the closing member relative to the second chamber being at least dependent on the prevailing pressure in the fluid dispensing container and the prevailing pressure in the first chamber, while in use the fluid connection is released when the pressure in the fluid dispensing container decreases below the predetermined pressure, so that gas flows from the second chamber to the fluid dispensing container and the pressure in the fluid dispensing container increases until the fluid connection is closed by the closing member as a result of the increased pressure in the fluid dispensing container, characterized in that, said fluid connection is provided outside of said cylinder and facing said closing member;

preferably said container is a PET container or a metal can, wherein the fluid dispensing container has a dispensing opening with a dispensing valve, and a movable piston is provided in the container between the pressure control device and the dispensing opening, which movable piston is separating the fluid and the gas, and which is movable towards the dispensing opening by the excess pressure prevailing in the fluid dispensing container; preferably the movable piston is designed as a dome with annular ribs, according to claim 16, comprising the step of: inserting a movable piston onto said pressure control device prior to positioning into said fluid dispensing container or positioning a movable piston inside said fluid dispensing container followed by insertion of said pressure control device.

19. Method for manufacturing a pressure control system according to claim 16, comprising the step of: inserting the stopper into a cylinder provided with venting means thereby leaving the first chamber under atmospheric pressure.

20. Method for manufacturing a pressure control system according to claim 16, wherein parts are joined by welding; preferably by laser welding; more preferably a bottom plate is welded to the second chamber; even more preferably both the second chamber and the fluid dispensing container are welded to the bottom plate.

* * * * *